United States Patent
Sugitani et al.

[11] Patent Number: 6,125,701
[45] Date of Patent: Oct. 3, 2000

[54] ANGULAR VELOCITY DETECTING APPARATUS

[75] Inventors: Nobuyoshi Sugitani, Susono; Yutaka Nonomura, Nagoya, both of Japan

[73] Assignee: Toyota Jidosha Kabushiki Kaisha, Toyota, Japan

[21] Appl. No.: 09/248,759

[22] Filed: Feb. 12, 1999

[30] Foreign Application Priority Data

Aug. 12, 1996 [JP] Japan ................................. 8-212617

[51] Int. Cl.[7] ........................................................ G01P 9/00
[52] U.S. Cl. ........................................................ 73/504.16
[58] Field of Search ........................... 73/504.16, 504.15, 73/504.12, 504.02

[56] References Cited

U.S. PATENT DOCUMENTS

| | | |
|---|---|---|
| 4,898,032 | 2/1990 | Voles . |
| 4,930,351 | 6/1990 | Macy et al. .......................... 73/504.16 |
| 5,056,366 | 10/1991 | Fersht et al. . |
| 5,166,571 | 11/1992 | Konno et al. ........................... 310/333 |
| 5,585,562 | 12/1996 | Kurata et al. ......................... 73/504.16 |

FOREIGN PATENT DOCUMENTS

| | | |
|---|---|---|
| 0 649 002 A1 | 10/1994 | European Pat. Off. ........ G01C 19/56 |
| 764828 | 3/1997 | European Pat. Off. . |
| 7-55479 | 3/1995 | Japan . |
| 9-089573 | 4/1997 | Japan . |
| 9-178492 | 7/1997 | Japan . |

Primary Examiner—Richard A. Moller
Attorney, Agent, or Firm—Kenyon & Kenyon

[57] ABSTRACT

In a three-dimensional coordinate space of X, Y, and Z, there are provided a vibrator having a vibrator base extending in the X-direction on the XY plane, a first vibrating bar projecting in the positive Y direction from the vibrator base and having a first natural frequency in the X-directions, and a second vibrating bar projecting in the negative Y direction from the vibrator base and having a second natural frequency in the X-directions, different from the first natural frequency; excitation means for exciting either the first or second vibrating bar in the Z-directions or in the X-directions; detection means for detecting the amplitude of vibration orthogonal to the Y-directions and to the directions of excitation of vibration caused in the first or second vibrating bar by the excitation means; and angular velocity calculating means for calculating an angular velocity of rotation about an axis in the Y-direction from the magnitude of the amplitude detected by the detection means, and the geometric dimensions of the first and second vibrating bars are determined so as to prevent the vibrator base from vibrating in the Z-directions when the first or second vibrating bar is excited by the excitation means. As so constructed, the angular velocity can be detected with high accuracy.

40 Claims, 13 Drawing Sheets

EXCITATION ELECTRODES

DETECTION ELECTRODES

↶ ELECTRIC FIELD

← EFFECTIVE FIELD

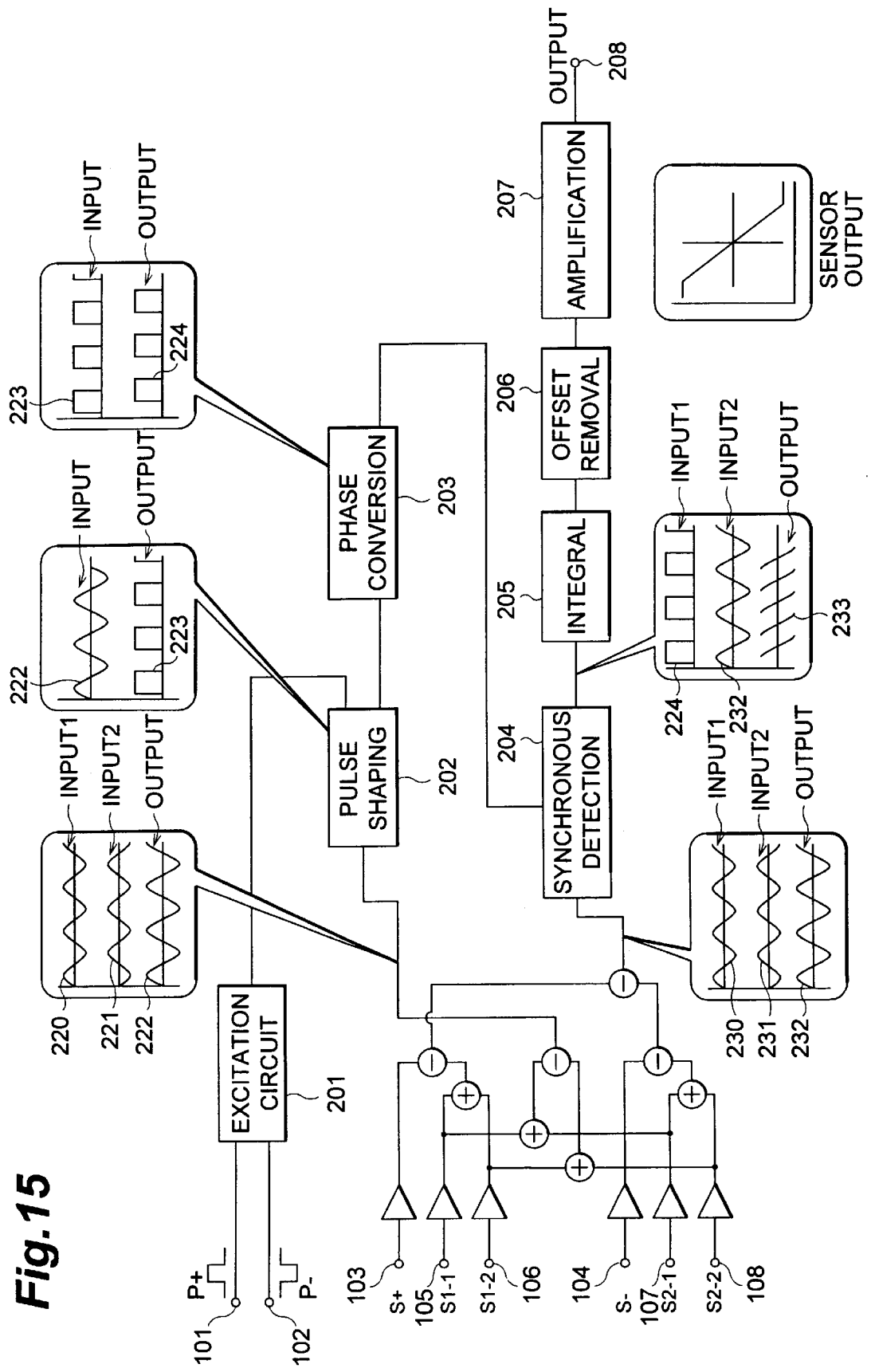

ANGULAR VELOCITY DETECTING APPARATUS

This application is a 35 U.S.C. §120 continuation of International Application PCT/JP97/02756.

BACKGROUND OF THE INVENTION

1. Field of the Invention

The present invention relates to an angular velocity detecting apparatus used in navigation systems, posture control, etc. of automobiles and, more particularly, to an angular velocity detecting apparatus of a vibration type.

2. Related Background Art

As a conventionally known vibration type angular velocity detecting apparatus there is the vibration type angular velocity detecting apparatus that makes use of occurrence of new vibration according to angular velocity of rotation because of Coriolis' force appearing on the occasion of rotating a vibrating body. An example of the angular velocity detecting apparatus of this type is a rotational velocity sensor, for example, as described in Japanese Laid-open Patent Application No. Hei 7-55479. A vibrator used in this rotational velocity sensor has the structure in which, in the XY plane, two excitation branches project in the positive Y direction from one edge of a rectangular frame and two pickup branches project in the direction of −Y from the opposite edge of the frame. In this structure, when the excitation branches are excited to vibrate in the X-directions, the excitation branches also vibrate in the Z-directions because of the Coriolis' force appearing with rotation of the vibrator and this vibration in the Z-directions is transmitted to the pickup branches. On the pickup branch side, this Z-directional vibration transmitted is detected and the angular velocity of rotation of the vibrator is derived from the detection result.

In the rotational velocity sensor of this type, however, though the excitation branches are excited to vibrate in the X-directions, part of the vibrational energy is converted to Z-directional vibration, so as to bring about leak vibration in the Z-directions. This leak vibration is also transmitted to the pickup branches as the Z-directional vibration based on the Coriolis' force was. Namely, Z-directional vibration as resultant vibration of the leak vibration and the vibration based on the Coriolis' force is transmitted to the pickup branches.

The amplitude of this leak vibration is far greater than that of the Z-directional vibration based on the Coriolis' force, so that the leak vibration can be big noise against the vibration based on the Coriolis' force. There is, however, a shift of 90° between phases of the leak vibration and the vibration based on the Coriolis' force, and the Z-directional vibrations both can be detected independently of each other.

Such Z-directional vibrations of the excitation branches and pickup branches are of mutually opposite phases with respect to the fulcrum at the central part of the frame, irrespective of either the leak vibration or the vibration based on the Coriolis' force. Specifically, when the excitation branches are deflected upward or in the positive Z direction, the pickup branches are deflected downward or in the negative Z direction.

Since the conventional, rotational velocity sensor described above is constructed without any consideration to a vibrational balance between the excitation branches and the pickup branches as to such Z-directional vibrations, the frame constituting the fulcrum of the both branches swings in the Z-directions according to the vibration of the both branches. This swing impedes transmission of the Z-directional vibration from the excitation branches to the pickup branches, so as to degrade detection accuracy of vibration at the pickup branches. Particularly, when excitation phases of the two excitation branches are reverse, a twist takes place in the frame, so that the degradation of detection accuracy becomes much greater.

SUMMARY OF THE INVENTION

The angular velocity detecting apparatus of the present invention has been accomplished to solve this problem and the apparatus comprises, in a three-dimensional coordinate space of X, Y, and Z, a vibrator having a vibrator base extending in the X-direction on an XY plane, a first vibrating bar projecting in the positive Y direction from the vibrator base and having a first natural frequency in the X-directions, and a second vibrating bar projecting in the negative Y direction from the vibrator base and having a second natural frequency in the X-directions, different from the first natural frequency, excitation means for exciting either the first or the second vibrating bar to vibrate the vibrating bar in the Z-directions or in the X-directions, detection means for detecting an amplitude of vibration orthogonal to the excitation directions of the vibration in the first or second vibrating bar by the excitation means, and angular velocity calculating means for calculating an angular velocity of rotation about an axis in the Y-direction from the magnitude of the amplitude detected by the detection means, wherein geometric dimensions of the first and second vibrating bars are determined so as to prevent the vibrator base from vibrating in the Z-directions when the first or second vibrating bar is excited to vibrate by the excitation means.

Specifically, the geometric dimensions of the first and second vibrating bars are determined so that the moment of inertia with respect to the fulcrum at a junction to the vibrator base, resulting from the Z-directional vibration of the first vibrating bar when the first or second vibrating bar is excited to vibrate by the excitation means, is substantially equal to the moment of inertia with respect to the fulcrum at a junction to the vibrator base, resulting from the Z-directional vibration of the second vibrating bar.

Here, the moment of inertia of a vibrating bar is defined with infinitesimal sections (mass points) of the vibrating bar, as the sum of values, each being the product of mass and the square of amplitude at each mass point, divided by a distance from the junction between the vibrating bar and the vibrator base to the mass point of interest.

Since in this structure the first natural frequency and second natural frequency in the X-directions are different from each other, X-directional vibration is rarely transmitted between the first vibrating bar and the second vibrating bar. When the vibrator is constructed of a single thin substrate, only Z-directional vibration is transmitted in mutually opposite phases. This means that the first vibrating bar and the second vibrating bar are coupled as to the Z-directional vibration. In addition, because the moment of inertia of the first vibrating bar is substantially equal to that of the second vibrating bar when the first and second vibrating bars are vibrated by the excitation means, the vibrator base, which constitutes the fulcrum of Z-directional vibration of the two vibrating bars, does not swing (or vibrate) in the Z-directions while the two vibrating bars vibrate in mutually opposite phases in the Z-directions. Therefore, there is little loss of the Z-directional vibration of the first and second vibrating bars due to the Z-directional vibration of the vibrator base.

As a consequence, for example, when the first vibrating bar is excited to vibrate in the X-directions and the vibrator rotates about an axis parallel to the Y-axis, the first vibrating bar and second vibrating bar vibrate in the Z-directions in the amplitude according to the angular velocity of rotation and in opposite phases. Since this Z-directional vibration is rarely attenuated, the Z-directional vibration can be detected at high sensitivity.

In a desirable configuration, the second vibrating bar is narrower and longer than the first vibrating bar, two sets of the first vibrating bar and second vibrating bar pairs are provided for the vibrator base, the vibrator base is fixed through a support rod to the detected body, this support rod extends in the Y-direction from the vibrator base between one vibrating bar pair and the other vibrating bar pair of the two sets of vibrating bar pairs and is fixed at an end thereof to the detected body, and the two first vibrating bars are excited to vibrate in mutually opposite phases.

In this configuration, the X-directional vibration is canceled out with each other between one vibrating bar pair and the other vibrating bar pair, thus suppressing the X-directional swing of the vibrator base.

Further, the amount of the leak of the X-directional vibration of the first vibrating bar into the Z-directional vibration can be decreased considerably by a configuration in which the X-directional width W of the first vibrating bar is 0.7 or less times the Z-directional thickness D thereof. The decrease of the Z-directional leak vibration relatively increases the Z-directional vibration component based on the Coriolis' force, thereby enhancing the detection accuracy.

When the vibration directions of excitation are changed from the X-directions to the Z-directions, self-excited vibration tends to be coupled between the first vibrating bar and the second vibrating bar in the same phase and in the Z-directions. If the phases of excitation are adjusted, for example, by providing the excitation means with the feedback function, the first vibrating bar and second vibrating bar will be able to be vibrated in mutually opposite phases and in the Z-directions. When the first vibrating bar and second vibrating bar can be vibrated in mutually opposite phases and in the Z-directions, the vibrator base does not swing in the Z-directions, because the moment of inertia with respect to the fulcrum at the junction to the vibrator base, resulting from the Z-directional vibration of the first vibrating bar, is substantially equal to that resulting from the Z-directional vibration of the second vibrating bar.

Further, when the frequency of excitation by the excitation means is made coincident with a higher natural frequency of the first or second vibrating bar in the Z-directions, movement is decreased of the center of gravity in the Z-direction, so as to suppress the Z-directional swing of the vibrator base more, thereby enhancing the detection accuracy.

BRIEF DESCRIPTION OF THE DRAWINGS

FIG. 15 is a circuit diagram to show a signal processing circuit of the third embodiment.

DESCRIPTION OF THE PREFERRED EMBODIMENTS

Figure 1A:
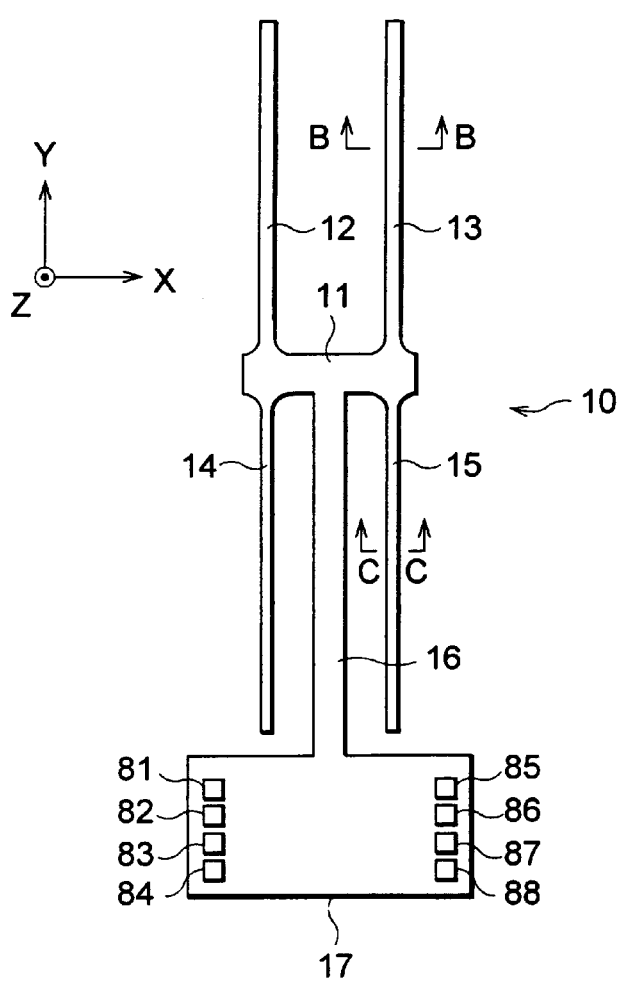
FIG. 1A is a plan view to show a vibrator of an angular velocity detecting apparatus as a first embodiment of the present invention.

FIG. 1A is a plan view to show the vibrator 10 in an embodiment of the present invention. In this figure, the horizontal directions are defined as an X-axis, the positive direction of the X-axis is taken along the rightward direction, the vertical directions are defined as a Y-axis, the positive direction of the Y-axis is taken along the upward direction, the directions normal to the plane of the figure are defined as a Z-axis, and the positive direction of the Z-axis is taken along the direction out of the figure. The vibrator 10 is composed of vibrator base 11 extending in the X-axis direction, first vibrating bars 12 and 13 for excitation extending in the positive Y direction from the vibrator base 11, second vibrating bars 14 and 15 for detection extending in the negative Y direction on the same axes as the first vibrating bars 12 and 13, respectively, from the vibrator base 11, support rod 16 extending in the negative Y direction from the vibrator base 11 between the second vibrating bars 14 and 15, and fixed plate 17 provided at an end of the support rod 16, these elements being integrally constructed of a single crystal substrate of quartz.

Here, the crystallographic axes of quartz will be described briefly. Natural quartz is generally a columnar crystal, in which the vertical center axis or <0001> crystal axis of this columnar crystal is defined as a Z-axis or optical axis and a line passing normal to the Z-axis and to each surface of the columnar crystal is defined as a Y-axis or mechanical axis. Further, a line passing normal to the Z-axis and a vertical edge of the columnar crystal is defined as an X-axis or electric axis.

A single-crystal substrate used for the vibrator 10 is a substrate called a Z-plate, which is a single-crystal substrate cut out by a surface normal or nearly normal to the Z-axis. Therefore, in the present embodiment, the crystallographic Z-axis agrees with the above-stated Z-axis representing the direction of placement of the vibrator 10 on the drawing. Since quartz has the crystal structure of three-fold symmetry with respect to the Z-axis, there are three sets of X-axis and Y-axis of quartz orthogonal to each other, among which one set agrees with the X-axis and Y-axis indicating the directions of placement of the vibrator 10 on the drawing. This relationship between the crystallographic directions and the directions of the vibrator 10 is also the same in the other embodiments described hereinafter. Quartz used for the vibrator 10 is artificial quartz, the structure of which is the same as that of natural quartz.

The first vibrating bars 12 and 13 have the same dimensions and both are used as vibrating bars for excitation of vibration in the present embodiment. The second vibrating bars 14 and 15 also have the same dimensions and both are used as vibrating bars for detection. The second vibrating bars 14 and 15 are narrower and longer than the first vibrating bars 12 and 13, so that the X-directional natural frequency $f_{x1}$ of the first vibrating bars 12, 13 is different from the X-directional natural frequency $f_{x2}$ of the second vibrating bars 14, 15. The Z-directional natural frequency of the first vibrating bars is also different from that of the second vibrating bars and, as to the Z-directional vibration, there exists a coupling natural frequency $f_z$ because of coupled vibration of the first vibrating bars and the second vibrating bars. There is little coupled vibration as to the X-directional vibration, because the transmission rate of vibration is very low between the first vibrating bars and the second vibrating bars. The reason why the first vibrating bars and the second vibrating bars are not coupled as to the X-directional vibration but are coupled as to the Z-directional vibration as described is that the whole of the vibrator 10 is integrally made of a very thin quartz substrate and in such a shape that the Y-directional width of the vibrator base 11 is adequately larger than the thickness of the quartz substrate. In the present embodiment, adjustment is made so that the X-directional natural frequency $f_{x1}$ of the first vibrating bars 12, 13 becomes very close to the coupling natural frequency $f_z$.

In addition, the moment of inertia about the fulcrum at the junction to the vibrator base 11 due to the Z-directional vibration of the first vibrating bar 12 when the first or second vibrating bar is vibrated by the excitation means described hereinafter is substantially equal to the moment of inertia about the fulcrum at the junction to the vibrator base 11 due to the Z-directional vibration of the second vibrating bar 14. Likewise, the moment of inertia about the fulcrum at the junction to the vibrator base 11 due to the Z-directional vibration of the first vibrating bar 13 is substantially equal to the moment of inertia about the fulcrum at the junction to the vibrator base 11 due to the Z-directional vibration of the second vibrating bar 15. Since the first vibrating bar and the second vibrating bar paired on the same axis have the nearly equal moments of inertia in the Z-directional vibration during the excitation as described, when the first vibrating bar and second vibrating bar are coupled to vibrate in opposite phases to each other, the vibrator base 11 is prevented from swinging in the Z-directions because of the vibration.

The moment of inertia of a vibrating bar in the present invention is, as already described, the sum of values obtained by dividing the vibrating bar into infinitesimal portions (mass points) and dividing the product of a mass at each mass point and the square of the amplitude by a distance from the junction between the vibrating bar and the vibrator base to the mass point of interest, and will be detailed below.

Figure 17:
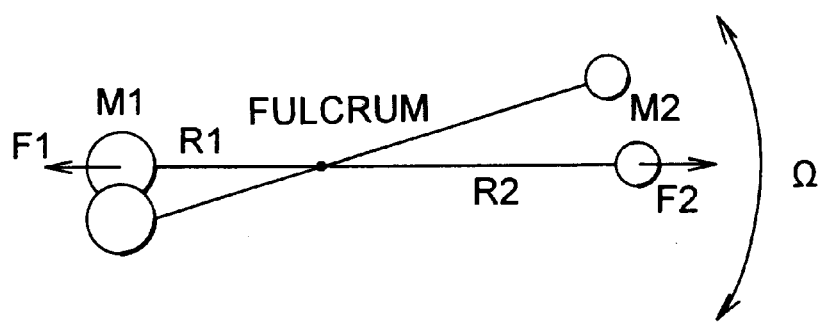
FIG. 17 is a fundamental diagram for explaining the moment of inertia.

Let us suppose that, as illustrated in FIG. 17, mass points M1, M2 are linked a distance R1 or R2 apart from the fulcrum and the mass points M1, M2 are rotating at constant angular velocity Ω about the fulcrum. At this time, in order to maintain constant rotation without motion of the fulcrum, the centrifugal forces F1, F2 acting on the two mass points M1, M2, respectively, must be balanced at the fulcrum. This can be expressed by equations as follows. The centrifugal force F1 acting on the mass point M1 is given by the following equation.

$$F1 = M1 R1 \Omega^2 \qquad (1)$$

The centrifugal force F2 acting on the mass point M2 is given as follows.

$$F2 = M2 R2 \Omega^2 \qquad (2)$$

Since F1 and F2 have opposite signs but equal values, the following relation of Eq. (3) is derived.

$$M1 R1 \Omega^2 = M2 R2 \Omega^2 \qquad (3)$$

Since the angular velocity Ω of rotation is identical, Eq. (3) leads to the following.

$$M1 R1 = M2 R2 \qquad (4)$$

Figure 18:
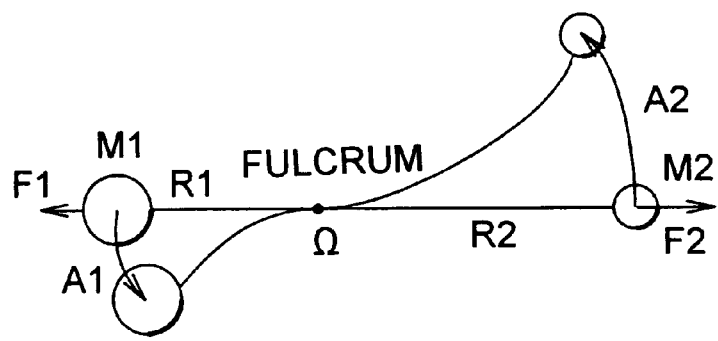
FIG. 18 is a fundamental diagram for explaining the moment of inertia.

FIG. 17, however, does not include consideration to warp occurring with the vibration. The actual vibration of the vibrating bars as illustrated in FIG. 1A involves deformation as illustrated in FIG. 18, for example. Namely, the constituent material for the :vibrating bars is an elastic body and cannot be regarded as a rigid body. Therefore, the warp occurs with vibration as illustrated in FIG. 18. This warp makes the difference between angular velocities $\Omega_1$, $\Omega_2$ at the mass points M1, M2. Each of these mass points M1, M2 of FIG. 18 corresponds to one mass point where each of the first vibrating bar 12 and second vibrating bar 14 of FIG. 1 is divided into infinitesimal portions.

Let us express the angular velocities $\Omega_1$, $\Omega_2$ at the middle point of vibration of each mass point M1, M2, using the amplitude A1, A2 of each mass point. First, displacements Z1, Z2 in the direction of vibration are expressed by Eq. (5) and Eq. (6) below, respectively, depending upon the frequency $\Omega_0$.

$$Z1 = A1 \sin \Omega_0 t \tag{5}$$

$$Z2 = A2 \sin \Omega_0 t \tag{6}$$

Hence, the velocities of vibration $R1\Omega1$ and $R2\Omega2$ are obtained as follows by differentiating Eqs. (5) and (6).

$$R1\Omega_1 = A1\Omega_0 \cos \Omega t \tag{7}$$

$$R2\Omega_2 = A2\Omega_0 \cos \Omega_0 t \tag{8}$$

An equation of balance between the centrifugal forces F1, F2 using these Eqs. (7) and (8) is obtained as follows.

$$M1R1 \ (A1\Omega_0 \cos \Omega_0 t/R1)^2 = M2R2(A2\Omega_0 \cos \Omega_0 t/R2)^2 \tag{9}$$

The following equation is thus derived from the above equation.

$$M1A1^2/R1 = M2A2^2/R2 \tag{10}$$

Since actual vibrating bars are assemblies of mass points, the first and second vibrating bars are constructed so as to substantially equalize the sums of values obtained by dividing each of the first and second vibrating bars into infinitesimal portions and dividing the product of mass $M_i$, $M_j$ of each mass point and the square of the amplitude $A_i$, $A_j$ at each mass point by the distance $R_i$, $R_j$ from the fulcrum or the junction between the two vibrating bars and the vibrator base.

Therefore, the condition for keeping the fulcrum fixed is as follows.

$$\sum_i M_i A_i^2 / R_i = \sum_j M_j A_j^2 / R_j \tag{11}$$

In the present invention, this is called "the moments of inertia are substantially equal."

In the present embodiment, the first vibrating bars 12, 13 are excited to vibrate in opposite phases to each other in the X-directions as described hereinafter, but part of energy of the vibration is converted to the Z-directional vibration, thereby causing leak vibration to vibrate them in the Z-directions. Amplitude values of this Z-directional leak vibration are determined by amplitude values of excitation vibration and thus the moments of inertia of the first and second vibrating bars can be obtained using these amplitude values as the amplitudes $A_i$, $A_j$ of above Eq. (11).

In addition to the leak of the excitation vibration, the Z-directional vibration also includes the vibration due to the Coriolis' force caused with rotation of the vibrator as described hereinafter. Amplitude values of the Z-directional vibration due to this Coriolis' force are necessary for detection of angular velocity. The amplitudes of the Z-directional vibration due to the Coriolis' force are, however, much smaller than those of the Z-directional vibration due to the leak of excitation vibration, and are thus negligible for the amplitudes $A_i$, $A_j$ in Eq. (11), which is the condition for substantially equalizing the moments of inertia of the first vibrating bar and second vibrating bar.

Figure 1B:
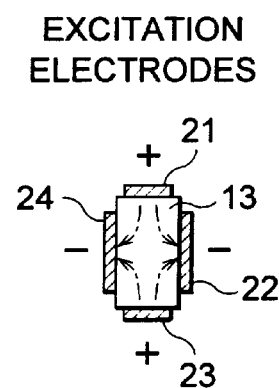
FIG. 1B is a sectional view along B—B in FIG. 1A.
Figure 1C:
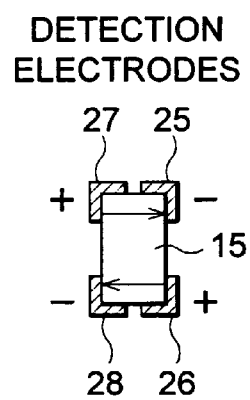
FIG. 1C is a sectional view along C—C in FIG. 1A.

Now, each vibrating bar is provided with electrodes according to use thereof. Specifically, the first vibrating bars 12 and 13 are provided with the electrodes for excitation of vibration, while the second vibrating bars 14 and 15 with the electrodes for detection. The arrangement of the electrodes is not illustrated in FIG. 1A in order to avoid minute illustration of the drawing and, instead thereof, it is illustrated using FIG. 1B and FIG. 1C. FIG. 1B and FIG. 1C are a sectional view along B—B and a sectional view along C—C, respectively, in FIG. 1A. As illustrated, the first vibrating bar 13 has electrodes 21 to 24 on its four faces of the top, the bottom, and the side faces, the electrodes 21 to 24 extending from the junction to the vibrator base 11 toward the tip of the first vibrating bar 13 or over the length of approximately ⅔ to ¾ of the entire length of the vibrating bar in the positive Y direction. The first vibrating bar 12 is also provided with like electrodes 31 to 34 (see FIG. 2). On the other hand, the second vibrating bar 15 is provided with four electrodes 25 to 28 placed so as to cover the four corners or edges of the rectangular cross section, respectively, the four electrodes 25 to 28 extending from the junction to the vibrator base 11 toward the tip of the second vibrating bar 15 or over the length of approximately ⅔ to ¾ of the entire length of the vibrating bar in the negative Y direction. The second vibrating bar 14 is also provided with like electrodes 35 to 38 (see FIG. 2).

Each electrode has the double-layered structure of chromium and gold, which is obtained by evaporating these metals on the surface of the vibrator 10 and thereafter properly separating them and patterning them in the desired pattern by the photolithography technology. Each electrode is electrically connected to either one of bonding pads 81 to 88 provided on the fixed plate 17 to be further connected therefrom to the signal processing circuit described hereinafter. Wires between the electrodes on the vibrating bars and the bonding pads are not illustrated, but they are provided on the surface of the support rod 16 by the film-forming technology.

Figure 2:
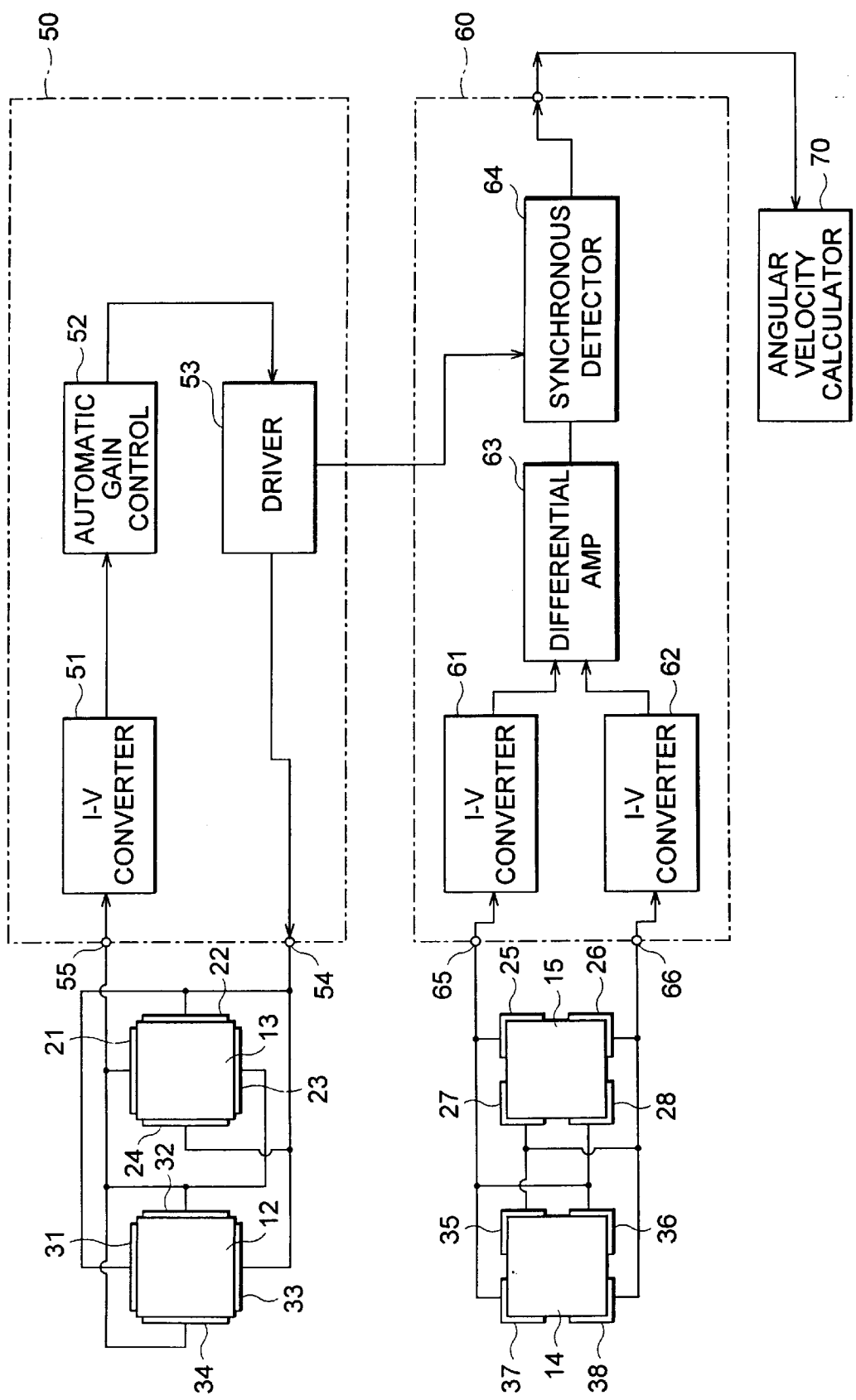
FIG. 2 is a block diagram to show an excitation circuit 50, a detection circuit 60, and an angular velocity calculating circuit 70 used in the angular velocity detecting apparatus of the first embodiment and to show the connection relation between these circuits and electrodes 21 to 28 and 31 to 38 placed on vibrating bars 12 to 15.
Figure 3A:
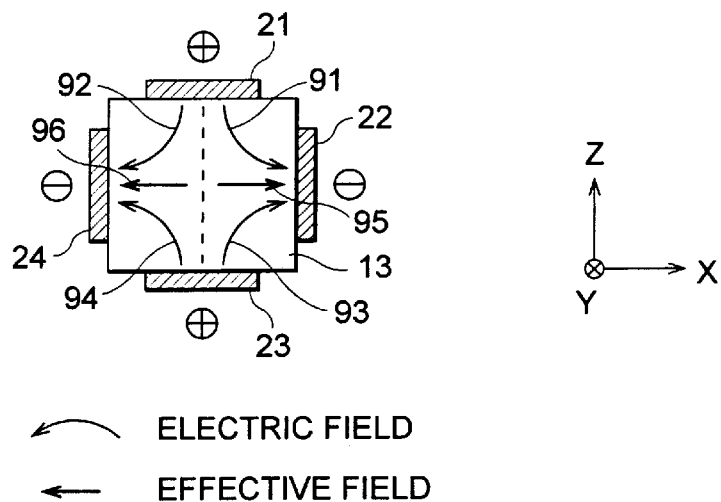
FIG. 3A is a sectional view for explaining the inverse piezoelectric effect in the first vibrating bars 12 and 13.
Figure 3B:
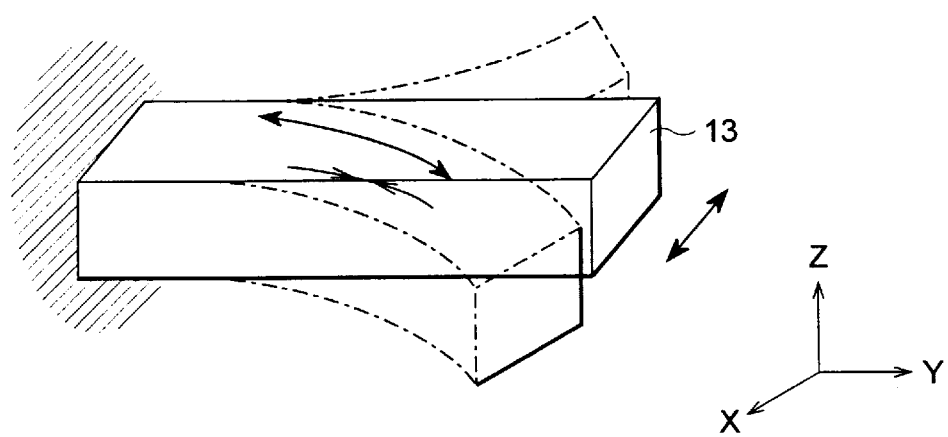
FIG. 3B is a perspective view for explaining the inverse piezoelectric effect in the first vibrating bars 12 and 13.
Figure 4A:
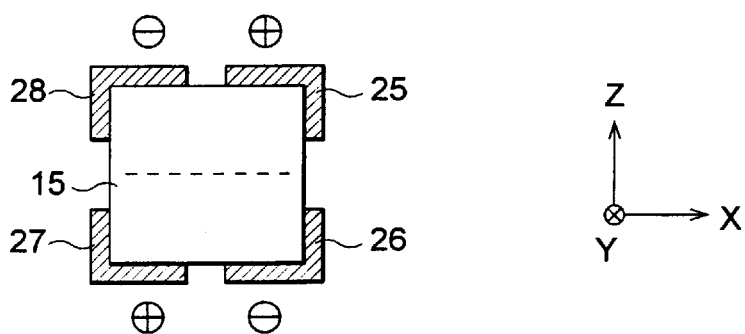
FIG. 4A is a sectional view for explaining the piezoelectric effect in the second vibrating bars 14 and 15.
Figure 4B:
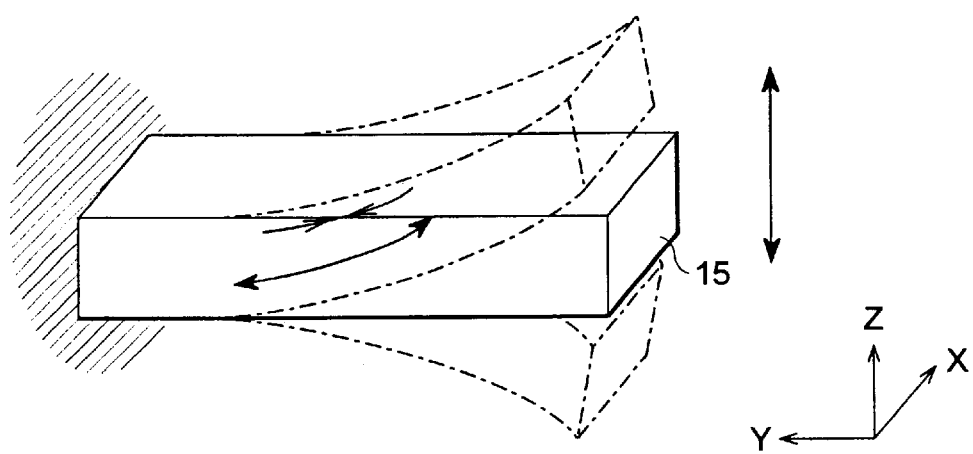
FIG. 4B is a perspective view for explaining the piezoelectric effect in the second vibrating bars 14 and 15.

FIG. 2 is a block diagram to show an excitation circuit 50, a detection circuit 60, and an angular velocity calculating circuit 70 used in the angular velocity detecting apparatus of the present embodiment and also show the connection relation between these circuits and the electrodes 21 to 28 and 31 to 38 provided on the vibrating bars 12 to 15. FIG. 3A and FIG. 3B are drawings for explaining the inverse piezoelectric effect in the first vibrating bars 12 and 13 and FIG. 4A and FIG. 4B are drawings for explaining the piezoelectric effect in the second vibrating bars 14 and 15.

The excitation circuit 50 is comprised of current-voltage converting circuit 51, automatic gain control 52, and driving circuit 53, and the detection circuit 60 is comprised of current-voltage converting circuits 61 and 62, differential amplifier 63, and synchronous detector 64.

The driving circuit 53 is a circuit to output a pulse wave having the amplitude and predetermined repetition frequency according to an output voltage value of the automatic gain control 52, as an excitation signal, and to output a signal having a phase shift of 90° from the output signal, as a detection signal of the synchronous detector 64, and an output terminal of the driving circuit 53 is connected via terminal 54 on common ground to the side electrodes 22, 24 of the first vibrating bar 13 and to the top and bottom electrodes 31, 33 of the first vibrating bar 12. The remaining electrodes 21, 23, 32, 34 of the first vibrating bars 12 and 13 are connected via terminal 55 common thereto to an input terminal of the current-voltage converting circuit 51, whereby they are fixed at an intermediate potential of the pulse wave outputted from the driving circuit 53.

FIG. 3A and FIG. 3B are drawings for explaining the excitation operation of the first vibrating bars by this excitation circuit 50. FIG. 3A is a sectional view of the first vibrating bar 13 cut by the ZX plane, which is a drawing equivalent to FIG. 1B. FIG. 3B is a perspective view to show bending operation of the first vibrating bar 13. As described above, the electrodes 21 and 23 are connected to the common terminal 55 and the electrodes 22 and 24 are connected to the common terminal 54; therefore, when the output pulse of the driving circuit 53 is a low level, the voltages as illustrated in FIG. 3A, i.e., relatively negative voltage and positive voltage are applied to each of the electrodes 22 and 24 and to each of the electrodes 21 and 23, respectively. When the output pulse of the driving circuit 53 is a high level, voltages of the opposite polarities are applied.

Now, let us consider a state in which the voltages as illustrated in FIG. 3A are applied. Then electric fields as illustrated by arrows 91 to 94 are created inside the vibrating bar 13. On the other hand, the piezoelectric effect of quartz does not appear in the Z-axis directions, so that effective fields to affect the piezoelectric effect are those indicated by arrows 95 and 96. The crystal of quartz expands in the Y-axis directions with application of an electric field in the positive direction of the X-axis but contracts in the Y-axis directions with application of an electric field in the negative direction of the X-axis because of the inverse piezoelectric effect. Therefore, in the state of FIG. 3A, the electrode 24 side of the vibrating bar 13 contracts while the electrode 22 side expands, so that the vibrating bar 13 is bent with the electrode 24 inside. When the polarities of the applied voltages to the electrodes 21 to 24 are inversed, the vibrating bar 13 is bent with the electrode 22 inside for the same principle. When the pulse signal of predetermined frequency is applied from the driving circuit 53 to the electrodes 21, 23 with fixing the vibrating bar 13 at one end, the vibrating bar 13 vibrates in the X-directions, as illustrated in FIG. 3B, accordingly.

Since the present embodiment is arranged so that the top and bottom electrodes 21 and 23 of the vibrating bar 13 and the right and left electrodes 32 and 34 of the vibrating bar 12 are connected to the common terminal as illustrated in FIG. 2 while the right and left electrodes 22 and 24 of the vibrating bar 13 and the top and bottom electrodes 31 and 33 of the vibrating bar 12 are connected to the common terminal as illustrated in FIG. 2, the vibrating bars 12 and 13 vibrate in opposite phases to each other in the X-directions.

Information of the X-directional vibration of the first vibrating bars 12 and 13 is fed back via the current-voltage converting circuit 51 and automatic gain control 52. The current-voltage converting circuit 51 is a circuit to convert a change amount of charge appearing in the electrodes 21, 23, 32, 34 because of the piezoelectric effect with bending of the first vibrating bars 12 and 13, to a voltage value.

The automatic gain control 52 receives the voltage signal outputted from the current-voltage converting circuit 51 and operates so as to decrease the output voltage with increasing input voltage but increase the output voltage with decreasing input voltage. As the amplitude of vibration of the first vibrating bars 12 and 13 increases, the charge appearing in the electrodes 21, 23, 32, 34 also increases and the output voltage of the current-voltage converting circuit 51 also becomes larger accordingly. This decreases the output voltage of the automatic gain control 52, so as to decrease the amplitude of the output pulse from the driving circuit 53.

The amplitude of the pulse signal outputted from the driving circuit 53 undergoes the feedback control in this way, whereby the amplitude of vibration of the first vibrating bars 12 and 13 becomes always stable.

Next described is the detection circuit 60 for detecting the Z-directional vibration of the second vibrating bar as illustrated in FIGS. 4A and 4B. When the second vibrating bar 15 vibrates in the Z-direction as illustrated in FIG. 4B to be bent in the positive Z direction, the upper half of the vibrating bar 15 contracts in the Y-directions while the lower half expands in the Y-directions. The piezoelectric effect of quartz causes dielectric polarization in the X-direction with the Y-directional contraction and dielectric polarization in the opposite X-direction with the Y-directional expansion. Since the strength of dielectric polarization is dependent on the magnitude of expansion or contraction, it appears strong in the top surface or in the bottom surface and becomes weaker toward the middle portion. Therefore, the dielectric polarization appears as concentrated at the four corners of the vibrating bar 15 and this dielectric polarization causes the positive or negative charge as illustrated to gather at the electrodes 25 to 28 provided at the corners. Namely, the electrodes 25 and 27 have the same polarity, this polarity being opposite to that of the electrodes 26 and 28. When the vibrating bar 15 is deflected downward, the opposite polarities to those described above appear based on the same principle.

The detection circuit 60 detects a change amount of the charge thus generated in each electrode of the vibrating bar 15 and outputs a signal according to the amplitude of the vibration of the second vibrating bar. In the present embodiment, the first vibrating bars 12, 13 are excited to vibrate in opposite phases to each other in the X-directions, so that the first vibrating bars and the second vibrating bars are vibrated in opposite phases to each other in the Z-directions; therefore, the second vibrating bars 14 and 15 vibrate in opposite phases to each other in the Z-directions. This Z-directional vibration of the second vibrating bars 14, 15 is combined vibration of the leak of the Y-directional vibration from the X-directional excitation vibration of the first vibrating bars 12, 13 and the vibration generated based on the Coriolis' force appearing with rotation of the vibrator 10 and has opposite phases to each other as to either component. The details of the generating mechanism of the Z-directional vibration based on the Coriolis' force will be described hereinafter, but it is noted that the vibration is generated in the opposite phases to each other in the Z-directions in any event. Therefore, the electrodes 25 and 28 of the second vibrating bar 15 are connected both to the electrodes 36 and 37 of the second vibrating bar 14 located at the positions in plane symmetry therewith and they are further connected to terminal 65 of the detection circuit 60. The remaining electrodes 26, 27, 35, 38 are connected all to common terminal 66 of the detection circuit 60.

The current-voltage converting circuit 61 is a circuit for converting a change amount of the charge in the electrodes 25, 28, 36, 37 to a voltage value and the current-voltage converting circuit 62 is a circuit for converting a change amount of the charge in the electrodes 26, 27, 35, 38 to a voltage value. The differential amplifier 63 is a circuit for receiving output signals of the respective current-voltage converting circuits 61 and 62 and amplifying a potential difference between the two signals, and the amplitude of this output signal corresponds to the amplitude of the vibration of the second vibrating bars 14 and 15.

The synchronous detection circuit 64 is a circuit for carrying out synchronous detection of the alternating voltage signal outputted from the differential amplifier 63 using a detection signal of a pulse signal having the phase shift of 90° with respect to the excitation signal from the driving circuit 53 and thereafter carrying out an integration operation, which is thus a circuit in which an integration circuit is added to the ordinary synchronous detection circuit. The Z-directional vibration due to the leak from X-excitation vibration has the same phase as the excitation vibration and the Z-directional vibration due to the Coriolis' force has the phase shift of 90° with respect to the excitation vibration. Therefore, the synchronous detection and integration makes the former always zero and the latter representing an integration value of full-wave-rectified signal. This means that the output signal voltage of the synchronous detection circuit 64 indicates the amplitude of the Z-directional vibration due to the Coriolis' force of the second vibrating bars 14 and 15.

The angular velocity calculating circuit 70 is a circuit for calculating the angular velocity of rotation about an axis parallel to the Y-axis of the vibrator 10 according to the relational equation between the angular velocity and the Coriolis' force described hereinafter, based on the output signal from the detection circuit 60 representing the amplitude of the vibration of the second vibrating bars 14 and 15.

Next described is the operation of the angular velocity detecting apparatus constructed as described above. The excitation circuit 50 outputs the excitation signal of the frequency equal to the X-directional natural frequency $f_{x1}$ (which will be called first natural frequency) of the first vibrating bars 12, 13 from the driving circuit 53. This causes the first vibrating bars 12, 13 to vibrate at the natural frequency $f_{x1}$ in the X-directions because of the inverse piezoelectric effect. The phases of the vibrating bar 12 and vibrating bar 13 are opposite to each other as described above.

When in this state the vibrator 10 rotates at the angular velocity Ω about an axis (including the Y-axis) parallel to the Y-axis, the Coriolis' force F represented by F=2 mV·Ω appears in the Z-directions in the first vibrating bars 12, 13. In this equation, m stands for the mass of vibrating bar and V for the vibrating velocity. This occurrence of the Coriolis' force F vibrates the first vibrating bars 12, 13 in the Z-directions with the phase shift of 90° with respect to the X-directional vibration. Namely, the first vibrating bars 12, 13 also vibrate at the frequency of the excitation vibration (the first natural frequency) in opposite phases to each other in the Z-directions. This frequency is almost coincident with the Z-directional, coupling natural frequency of the first and second vibrating bars, and is thus efficiently transmitted to the second vibrating bars 14, 15.

On the other hand, the X-directional excitation vibration given to the first vibrating bars 12, 13 leaks as Z-directional excitation vibration of the same phase and this vibration is also transmitted as coupled vibration to the second vibrating bars 14, 15. Since the vibration energy of this leak vibration is much greater than that of the vibration due to the Coriolis' force, the Z-directional vibration of the second vibrating bars is superposition of the vibration due to the Coriolis' force with the phase shift of 90° on the leak vibration.

Figure 5A:
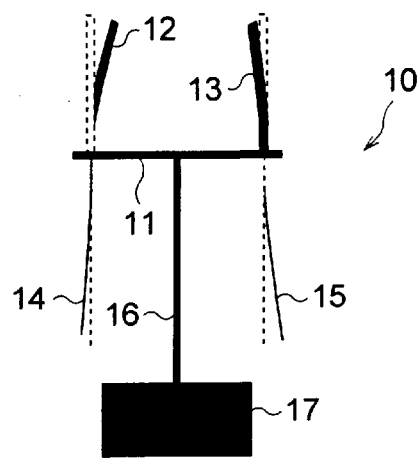
FIG. 5A is a diagram to show the motion of vibrator 10 of this embodiment.
Figure 5B:
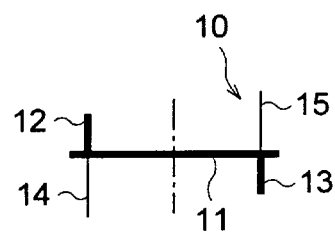
FIG. 5B is a top plan view to show the motion of vibrator 10 of this embodiment.
Figure 6A:
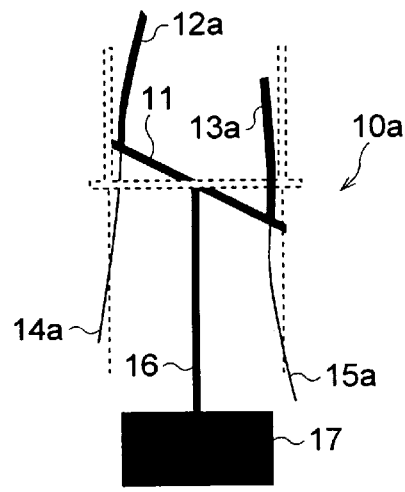
FIG. 6A is a diagram to show the motion of vibrator 10a under the assumption that the vibrator 10 is replaced by the vibrator 10a in which the moment of inertia of the first vibrating bar is not coincident with that of the second vibrating bar, for comparison with the vibrator 10 of this embodiment.
Figure 6B:
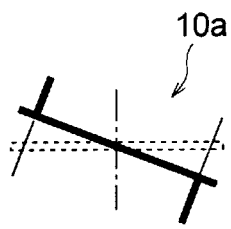
FIG. 6B is a top plan view to show the motion of vibrator 10a under the assumption that the vibrator 10 is replaced by the vibrator 10a in which the moment of inertia of the first vibrating bar is not coincident with that of the second vibrating bar, for comparison with the vibrator 10 of this embodiment.

Now, the motion of the vibrator 10 occurring with the Z-directional vibration will be described using FIGS. 5A, 5B, 6A, and 6B. FIGS. 5A and 5B show the motion of the vibrator 10 of the present embodiment and FIGS. 6A and 6B show the motion of vibrator 10a having such assumed structure that the moment of inertia of the first vibrating bars is not coincident with that of the second vibrating bars, in place of the vibrator 10, for comparison with the vibrator 10 of the present embodiment. FIGS. 5A and 6A are plan views to schematically show the vibrator 10 or 10a, in which the black solid vibrating bars 12 to 15 or 12a to 15a show a state of vibration of the upper and lower and the right and left vibrating bars in opposite phases and in which the four vibrating bars indicated by dotted lines show a stationary state. It is, however, noted that the motion of the X-directional vibration is ignored. The coordinate system herein is the same as in FIG. 1A. FIGS. 5B and 6B are front elevations of the vibrator 10 or 10a observed from the tip (in the Y-direction).

In FIGS. 5A, 5B, 6A, and 6B, the first vibrating bar 12, 12a is deflected in the negative Z direction and the second vibrating bar 14, 14a is deflected in the positive Z direction. The first vibrating bar 13, 13a is deflected in the direction of +Z and the second vibrating bar 15, 15a in the negative Z direction. At this time, in the case of the vibrator 10 of the present embodiment where the moment of inertia of the first vibrating bar 12 is coincident with that of the second vibrating bar 14, Z-directional forces exerted on the junction to the vibrator base 11 by the two vibrating bars 12 and 14 cancel each other out, so that no substantial force is exerted in the Z-direction. This is also the case for the right pair of vibrating bars. Therefore, as illustrated in FIG. 5B, the vibrator base 11 is not deflected in the Z-directions at all even though each vibrating bar 12 to 15 is deflected in the Z-directions.

On the other hand, in the case of the vibrator 10a illustrated in FIGS. 6A, 6B where the moment of inertia of the first vibrating bar 12a is not coincident with that of the second vibrating bar 14a, the vibrator base 11 vibrates in the same directions as the bar with the smaller moment of inertia. Since in this example the first vibrating bars have the smaller moment of inertia than the second vibrating bars, when the first vibrating bar 12a is deflected in the negative Z direction, the vibrator base 11 is also deflected in the negative Z direction. As for the right pair of vibrating bars, i.e., the first vibrating bar 13a and second vibrating bar 15a, the vibrator base 11 is deflected in the positive Z direction at this time, because the vibrating bars vibrate in horizontally opposite phases. Since the vibrator base 11 is deflected in the negative Z direction on the left side and in the positive Z direction on the right side in this way, a force to twist the support rod 16 is exerted with the vibration of the vibrating bars. This twisting motion promotes the leak of vibration, so as to impede stable vibration.

As described referring to FIGS. 5A and 5B, this twist does not appear in the case of the vibrator 10 of the present embodiment, whereby stable vibration can be maintained with little vibration leak. This brings about preservation of good sensitivity and stability against temperature change and secular change.

Although the present embodiment is arranged in such structure that the vibrator base 11 is supported by the support rod 16 connected to the central part thereof, there are less restrictions on the supporting method of the vibrator base 11 because of the little vibration leak through the support rod as described above. Therefore, sufficiently good detection sensitivity can also be achieved even by other supporting methods. For example, the support rod 16 may be replaced by a support rod extending from the vibrator base 11 in the direction of +X or −X and connected to the fixed plate at the tip thereof. It is a matter of course that the vibrator may also be fixed at two positions, using support rods extending in the +X and −X and connected to respective fixed plates at the tip of each rod. In addition to these methods, support rods may be arranged to extend in the +Y and −Y from the central part of the vibrator base 11 and are connected to respective fixed plates at the tip of each rod; or another configuration may also be employed in such structure that the vibrator base is formed in a frame shape, the fixed plate is placed inside thereof, and the fixed plate and the frame are linked by the support rod, as in the case described in Japanese Laid-open Patent Application No. 7-55479 which was cited before as prior art of the present invention. Further, the length of the support rod can be properly selected in these various variations as occasion may demand.

In this way, the Z-directional vibration generated in the first vibrating bars 12, 13 is transmitted well to the second vibrating bars 14, 15. The Z-directional vibration of the second vibrating bars 14, 15 induces the change of charge in the electrodes 25 to 28, 35 to 38 and, based thereon, the detection circuit 60 detects the amplitude of the Z-directional vibration due to the Coriolis' force of the second vibrating bars 14, 15. The angular velocity calculating circuit 70 calculates the Coriolis' force F in the first vibrating bars 12, 13 from the information of the vibration amplitude of the second vibrating bars 14, 15 outputted from the detection circuit 60 and further calculates the angular velocity Ω of rotation about the axis parallel to the Z-axis of the vibrator 10, based on the relation of F=2 mV·Ω described above.

Figure 7:
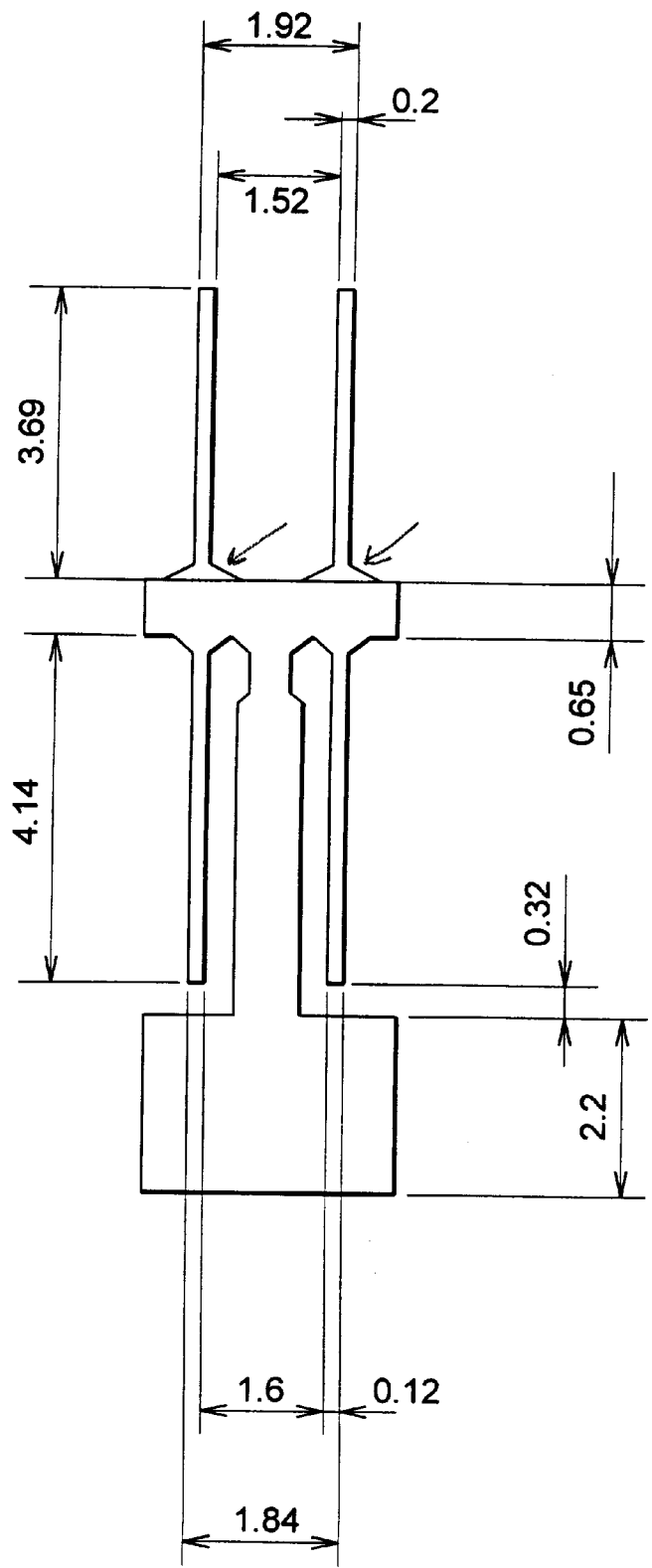
FIG. 7 is a plan view to show the dimensions of the vibrator of this embodiment.

Next described is a method for designing the vibrator in which the moment of inertia of the first vibrating bars is coincident with that of the second vibrating bars. FIG. 7 shows the result of dimensions determined based on this designing method. First determined is the Z-directional natural frequency fn of the second vibrating bars narrower and longer than the first vibrating bars. The natural frequency fn is determined based on the following equation.

$$fn = \frac{\lambda n^2 \cdot h}{2\pi \cdot L2^2} \sqrt{\frac{E \cdot g}{12 \cdot r}} \tag{12}$$

In this equation, E represents a coefficient of longitudinal elasticity of quartz, r the density of quartz, λn a constant of primary vibration, g the acceleration of gravity, L2 the length of the second vibrating bars, and h the thickness of the vibrating bars (the thickness of the vibrator).

From material constants etc. of quartz, the following is given.

$E=7.99\times10^9$ kg/m$^2$ $r=2.65\times10^3$ kg/m$^3$ $\lambda n=1.85$ $g=9.8$ Now, let us employ the quartz plate of h=0.3 mm and suppose L2=4.14 mm. Since it is empirically known as to the Z-directional vibration of the vibrating bars that, regarding them as a single vibrator, a computation result agrees well with actual natural frequency if computation is carried out assuming that the vibrator has the thickness equal to ⅚ of the actual thickness, h is thus set to 0.25 mm. Substituting these numerical values into above Eq. (12), fn=12.47 kHz, so that the second vibrating bars have the natural frequency of about 12.5 kHz. Meanwhile, the present embodiment experiences coupled vibration of the first vibrating bars and the second vibrating bars as to the Z-directional vibration, as previously described. Then the natural frequency of this coupled vibration becomes closer to the natural frequency of the narrower and longer, second vibrating bars than the natural frequency of the first vibrating bars which are relatively wider and shorter. This is probably because the narrower and longer, second vibrating bars have the amplitude and stress greater than the wider and shorter, first vibrating bars. It is, therefore, assumed as to the Z-direction that the natural frequency of the coupled vibration of the first vibrating bars and the second vibrating bars is equal to the natural frequency of the second vibrating bars.

Next, let us consider the condition for equalizing the X-directional natural frequency of the first vibrating bars to the Z-directional natural frequency of the second vibrating bars (i.e., to the natural frequency of coupled vibration). Let W1 be the X-directional width of the first vibrating bars, L1 be the length thereof, Z1 be the amplitude of the Z-directional vibration, W2 be the X-directional width of the second vibrating bars, L2 be the length thereof, Z2 be the amplitude of the Z-directional vibration, and h be the thickness of the vibrator. Then, from the fact that the X-directional natural frequency of the first vibrating bars is equal to the Z-directional natural frequency of the second vibrating bars and from Eq. (12), W1/L1$^2$=h/L2$^2$ is derived. Now, substituting h=0.25 and L2=4.14 into the equation, we obtain the following.

$$W1=0.01459L1^2 \tag{13}$$

Further, considering the condition for equalizing the moment of inertia of the first vibrating bars to the moment of inertia of the second vibrating bars, the following needs to be satisfied.

$$L1^2 \cdot W1 \cdot h \cdot Z1 = L2^2 \cdot W2 \cdot h \cdot Z2$$

Now, supposing the ratio of Z-directional amplitudes of the first vibrating bars and the second vibrating bars, i.e., Z1:Z2 is equal to 4:5 and 0.12 mm is selected as W2, we obtain the following.

$$L1^2 \cdot W1 = 4.14 \cdot 0.12 \cdot 5/4 \tag{14}$$

Solving above Eq. (13) and Eq. (14), we obtain W1=0.194 and L1=3.64. In fact, in order to match frequencies of excitation and detection with each other, analysis was made by FEM and W1=0.2 and L1=3.69 were employed. The dimensional diagram of FIG. 7 shows the result of the above.

The vibrator designed as described above was prepared and vibration experiments were carried out. The difference Δf was 150 Hz between the X-directional natural frequency of the first vibrating bars and the Z-directional natural frequency of the second vibrating bars and the value of A/B indicating the degree of agreement of the moments of inertia was smaller than 0.1. A/B represents a ratio of Z-directional maximum displacement amount (A) at the base of the vibrating bars to Z-directional maximum displacement amount (B) at the tip of the vibrating bars and it can be said that a smaller ratio indicates a higher degree of agreement between the moments of inertia.

Figure 8:
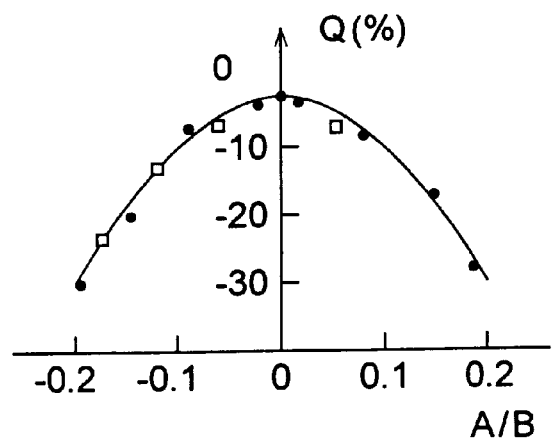
FIG. 8 is a characteristic diagram to show the relation between A/B value and Q value of Z-directional vibration.

FIG. 8 is a characteristic diagram to show the relation between A/B value and Q value of Z-directional vibration. The ordinate represents changes of Q value of Z-directional vibration in percentage with respect to the reference of an ideal vibrator having A/B=0, and the abscissa represents A/B values. The difference Δf between the X-directional natural frequency and the Z-directional natural frequency at this time is ¹⁄₁₀₀ of the frequency of the excitation. It is seen from this characteristic diagram that the vibration leak to the outside increases with increasing values of A/B and Q values of vertical vibration become smaller. The decrease of Q value results in degrading the sensitivity of the angular velocity detecting apparatus. It thus becomes significant how much agreement is made between the moments of inertia, i.e., how much tolerance is permitted for the value of A/B. In the above-stated example A/B is 0.1 and the Q value is about 10% lower than that of the ideal vibrator from FIG. 8. When this was used as a yaw rate sensor for control of posture of car, fully satisfactory sensitivity was achieved.

Next described is the vibration leak from the X-directional vibration to the Z-directional vibration in the first vibrating bars 12, 13, which are the vibrating bars for excitation of vibration. The vibrator 10 is produced by etching of the Z-plate of quartz and there remains a ridge extending in the Y-direction on each side face of each vibrating bar because of anisotropy of the etching. This is the cause of the vibration leak from the X-directional vibration to the Z-direction vibration.

On the other hand, the present embodiment is designed so that the X-directional natural frequency of the first vibrating bars becomes close to the Z-directional coupling natural frequency of the first and second vibrating bars. The Z-directional coupling natural frequency is close to the Z-directional natural frequency of the narrower and longer, second vibrating bars with relatively large vibration stress. In other words, the Z-directional natural frequency of the first vibrating bars is relatively distant from the X-directional natural frequency thereof. Therefore, coupling is weak between the X-directional vibration and the Z-directional vibration in the first vibrating bars, so that there is little leak of the X-directional excitation vibration to the Z-directional vibration. This leak vibration is nothing but noise from the aspect of detecting the vibration due to the Coriolis' force; therefore, the detection sensitivity can be enhanced more as the leak vibration decreases.

Figure 9:
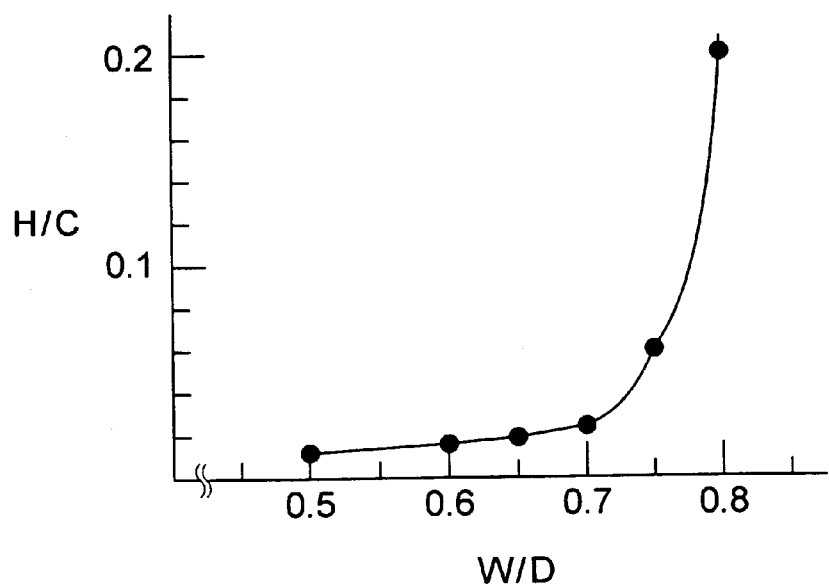
FIG. 9 is a graph to show the relation between ratio W/D of the width W to the thickness D of the vibrating bars and ratio H/C of the Z-directional component during X-directional excitation.

The difference between the X-directional natural frequency and the Z-directional natural frequency of the first vibrating bars 12, 13 results from the difference between the thickness D and the width W of the vibrating bars. FIG. 9 is a graph to show the relationship between the ratio W/D of the width W to the thickness D and the rate H/C of the Z-directional component during the excitation in the X-directions. This graph is the result of measurement of the Z-directional vibration component where a plurality of vibrating bars having an equal length but different widths W were provided on the quartz substrate of the thickness 0.3 mm and were vibrated in the X-directions. It is seen from this graph that the vibration leak decreases suddenly where W/D is not more than 0.7. The example illustrated in FIG. 7 has W of 0.2 and D of 0.3 and thus W/D of 0.67. It is thus understood that the vibration leak is very little.

Now, let us describe the second embodiment of the present invention. The basic structure of the vibrator of the second embodiment is substantially the same as the vibrator 10 of the first embodiment illustrated in FIG. 1A. Specifically, the vibrator is composed of the vibrator base extending in the X-axis direction, two first vibrating bars which are relatively wide and short and which extend in the positive Y direction from the vibrator base, two second vibrating bars which are relatively narrow and long and which extend in the negative Y direction from the vibrator base on the same axes as the first vibrating bars associated therewith, the support rod extending in the direction of −Y from the vibrator base between the two second vibrating bars, and the fixed plate provided at the end of the support rod, these elements being integrally made of the single-crystal substrate of quartz. The moment of inertia about the fulcrum at the junction to the vibrator base due to the Z-directional vibration of the first vibrating bars is substantially equal to that due to the Z-directional vibration of the second vibrating bars.

The second embodiment is different from the first embodiment in that the narrower and longer, second vibrating bars are excited to vibrate in the X-directions. The Z-directional vibration generated by the Coriolis' force is detected by the second vibrating bars as in the case of the first embodiment. Namely, this vibrator is arranged to carry out the X-directional excitation of vibration and the detection of Z-directional vibration by use of the same vibrating bars. For that, the same electrodes as the electrodes 21 to 24, 31 to 34 for excitation, described in the first embodiment, are provided on the tip side of the second vibrating bars and the same electrodes as those 25 to 27, 35 to 37 for detection on the base side of the second vibrating bars.

This embodiment is designed so that the X-directional natural frequency of the second vibrating bars becomes nearly equal to the Z-directional coupling natural frequency of the first and second vibrating bars, and the Z-directional coupling natural frequency is close to the Z-directional natural frequency of the narrower and longer, second vibrating bars, as described in the first embodiment. Namely, the X-directional natural frequency and the Z-directional natural frequency of the second vibrating bars are close to each other. Accordingly, coupling (transmission of vibration) is strong in the second vibrating bars; the vibration energy in the Z-directions is one transmitted from the X-directional vibration in the same second vibrating bar, and the moment of inertia of the first vibrating bars can be made coincident with that of the second vibrating bars by relatively easy analysis of Z-directional natural frequency. This embodiment permits adjustment of the Z-directional coupling natural frequency by adjustment of the mass of the first vibrating bars which are not used directly for either of excitation and detection. When different vibrating bars are used for excitation and for detection, they tend to be affected by temperature characteristics of transmission or the like because of intervention of transmission of vibration between the two vibrating bars. In contrast, the vibrator of the present embodiment uses the same vibrating bars for detection and for excitation; therefore, it is hardly affected by the temperature change or the like and thus has high reliability of detection.

Described below are procedures of specific dimension designing. First, the length L2 and width W2 of the second vibrating bars are determined. In this example, L2=6 mm and W2=0.25 mm. These are substituted into next Eq. (15) to compute the X-directional natural frequency.

$$fn = \frac{\lambda n^2 \cdot W2}{2\pi \cdot L2^2} \sqrt{\frac{E \cdot g}{12 \cdot r}} \tag{15}$$

In this equation, E represents the coefficient of longitudinal elasticity of quartz, r the density of quartz, $\lambda n$ the constant of primary vibration, and g the acceleration of gravity. From material constants etc. of quartz, $E=7.99 \times 10^9$ kg/m$^2$, $r=2.65 \times 10^3$ kg/m$^3$, $\lambda n=1.85$, and $g=9.8$. When these values are also substituted into the above equation, fn=5938.7 Hz.

Let us next consider the Z-directional vibration. As previously stated, this vibrator is desirably designed so that the X-directional natural frequency and the Z-directional natural frequency of the second vibrating bars are close to each other. Theoretically, the X-directional natural frequency agrees with the Z-directional natural frequency where the vibrating bar has the width and thickness equal to each other, i.e., where the vibrating bar has the square cross section. It is empirically known that, for example, in the case of such a tuning fork shape that two vibrating bars project from the vibrator base, the X-directional natural frequency becomes coincident with the Z-directional natural frequency when the thickness is set to about 6/5 of the width. The thickness becomes 0.3 mm accordingly.

Figure 10:
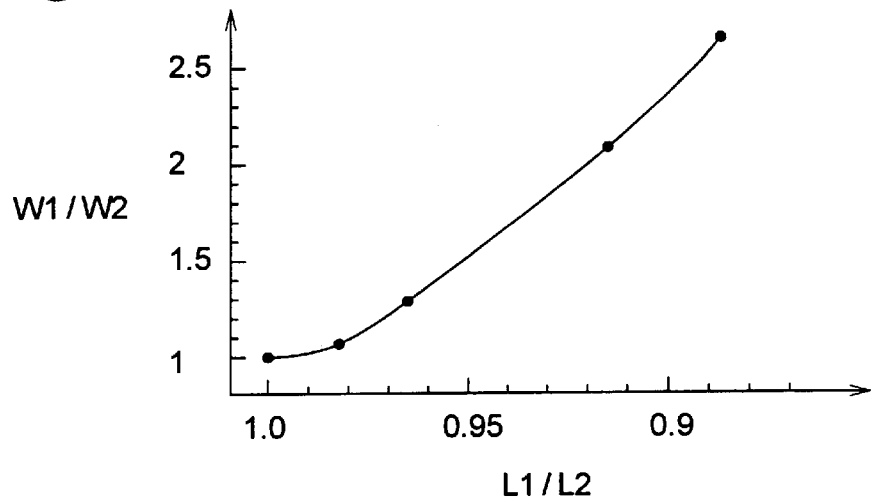
FIG. 10 is a characteristic diagram to show conditions to match the moments of inertia of the first vibrating bar and the second vibrating bar with each other in the relation between length ratio L1/L2 and width ratio W1/W2 of the first and second vibrating bars.
Figure 11:
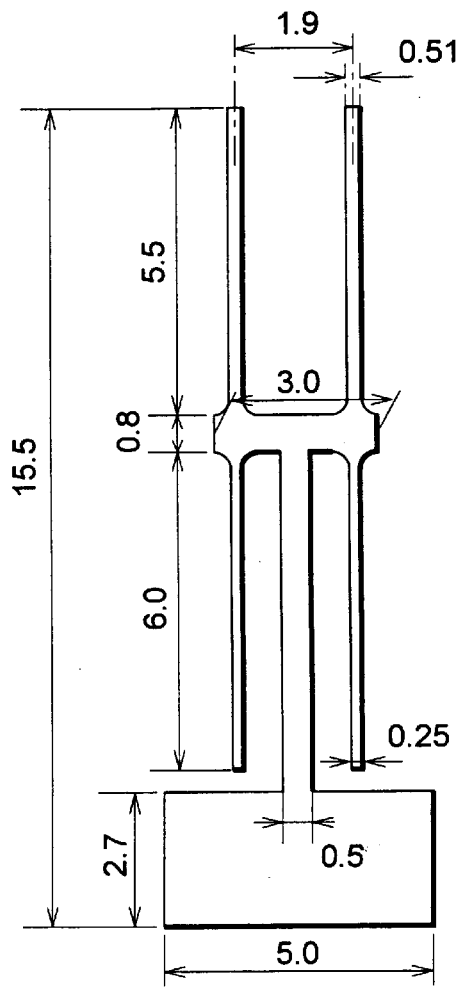
FIG. 11 is a plan view to show the vibrating bars of a second embodiment of the present invention.

Now the shape of the second vibrating bars is determined, the shape of the first vibrating bars is next to be determined. Since the whole of the vibrator is constructed of the single quartz substrate, the thickness is already determined as 0.3 mm. Therefore, it is necessary to determine the length L1 and width W1. FIG. 10 shows the condition for matching the moment of inertia of the first vibrating bars with that of the second vibrating bars in the relation between the ratio of lengths L1/L2 and the ratio of widths W1/W2 of the first and second vibrating bars. In the present embodiment the length L2 of the narrower and longer, second vibrating bars was determined as 6.0 mm and the width W2 thereof as 0.25 mm and, for example, supposing the length L1 of the wider and shorter, first vibrating bars is set to 5.5 mm, the length ratio L1/L2 is given as 5.5/6=0.917. Applying this to FIG. 10, the condition for matching the moments of inertia is that the width ratio W1/W2 is 2.05, and thus W1 is 0.51 mm. FIG. 11 is a plan view with indication of the dimensions of the vibrator dimension-designed as described above.

The second embodiment is arranged to excite the second vibrating bars in the X-directions and detect the Z-directional vibration of the same second vibrating bars, but a modification thereof can be arranged in such structure that the detection electrodes are shifted onto the first vibrating bars as they are, thereby providing another angular velocity detecting apparatus using the vibrator with the second vibrating bars for excitation and the first vibrating bars for detection.

Since this modification employs the vibrating bars for excitation and the vibrating bars for detection different from each other like the first embodiment, the electrodes for excitation and for detection can be designed larger, which increases the efficiency. In addition, the number of wires on each vibrating bar is smaller than that in the basic form of the second embodiment, which facilitates wiring and compactification. It can also decrease crosstalk of signal due to influence of capacitor components or the like of wires. Further, the electrodes for detection ideally detect only the Z-directional vibration, but they actually have slight sensitivity in the X-directions as well. When compared with the basic form of the second embodiment using the same vibrating bars for detection and excitation, S/N is higher in terms of the electrode sensitivity in this modification in which the X-directional vibration is absent in the vibrating bars for detection.

In either of the first embodiment and the second embodiment described above, either the first or the second vibrating bars are excited in the X-directions, and it is desirable to prevent the X-directional vibration thereof from being transmitted to the other vibrating bars placed on the other side of the vibrator base as much as possible. From this aspect, the shape of the vibrator was investigated. This investigation verified that transmission of the X-directional vibration was able to be suppressed between the first vibrating bars and the second vibrating bars by boring a hole penetrating in the Z-direction in the central part of the vibrator base. On the other hand, the Z-directional vibration needs to be coupled vibration of the first vibrating bar and the second vibrating bar opposed to each other, and it is thus desirable to integrally form the first vibrating bar and the second vibrating bar, though there is the vibrator base in between. In order to accomplish it, it is thus desirable to set the X-directional width of the through hole to be narrower than both of the inside wall gap between the two first vibrating bars and the inside gap between the two second vibrating bars. When the through hole is made in such size and has the center aligned with the center of the vibrator base, almost linearly continuous and strong coupling can be achieved through the vibrator base between the first vibrating bars and the second vibrating bars.

Figure 12:
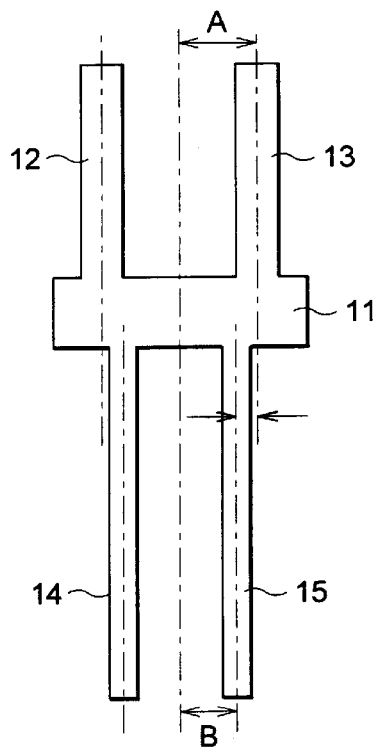
FIG. 12 is a plan view to show a modification of the vibrating bars of the first or second embodiment.

In the first and second embodiments, as illustrated in FIG. 1A, the longitudinal (Y-directional) axes of the first vibrating bar 12 and the second vibrating bar 14 are almost aligned with each other and the longitudinal (Y-directional) axes of the first vibrating bar 13 and the second vibrating bar 15 are almost aligned with each other. In another configuration the longitudinal axes of the first vibrating bar and the second vibrating bar opposed to each other may be shifted on the XY plane while maintaining their parallelism, as illustrated in FIG. 12. This configuration can suppress the transmission of the X-directional vibration more. In FIG. 12, A>B where A represents the distance from the center of the vibrator base to the Y-axis of the first vibrating bar and B the distance from the center to the Y-axis of the second vibrating bar. Another configuration may be arranged in the inverse relation of A<B, which can also suppress the X-directional vibration strongly.

Suppose that the inertial masses of the first and second vibrating bars are M1 and M2, respectively, the amplitudes of the first and second vibrating bars are P1 and P2, the inertial masses of the vibrating bars are set so as to prevent the vibrator from rotating about the center axis thereof (the Y-directional center axis), thereby balancing the vibration, and A>B. Then the amplitude of the second vibrating bars can be greater than in the case of A=B.

Figure 13:
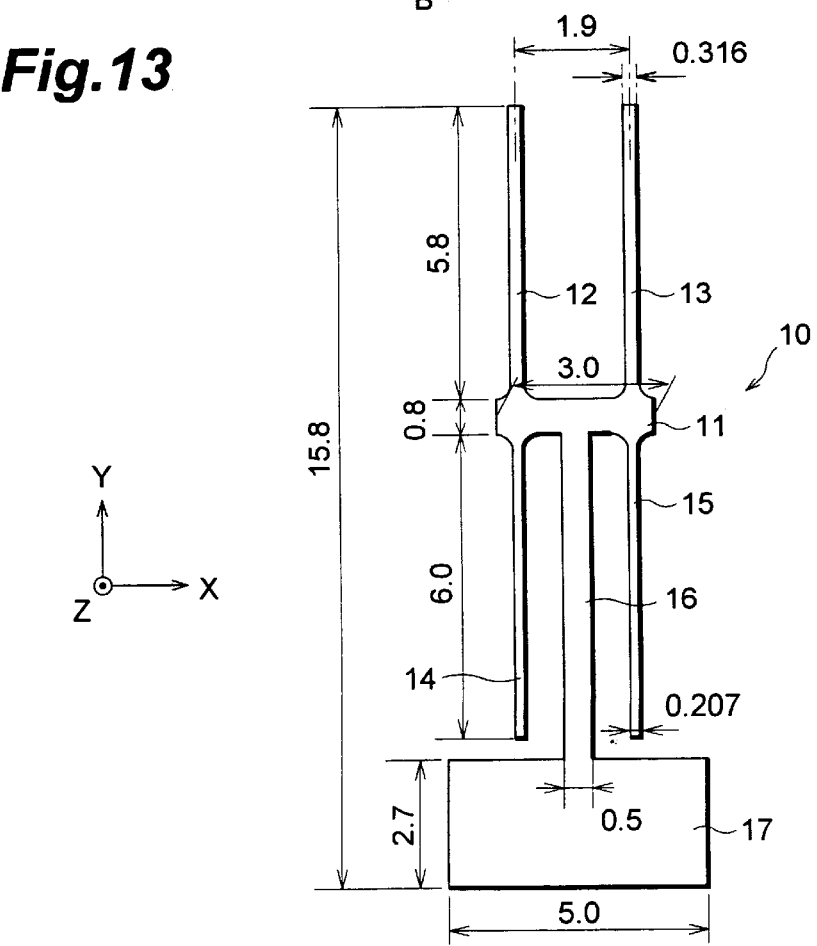
FIG. 13 is a plan view to show the vibrating bars of a third embodiment of the present invention.

Next described is the third embodiment of the present invention. The basic structure of the vibrator is similar to that of the first and second embodiments, as illustrated in FIG. 13, wherein the vibrator has the two first vibrating bars 12, 13 which are wider and shorter and which project from the vibrator base 11 in the direction of +Y and the two second vibrating bars 14, 15 which are narrower and longer and which project in the direction of −Y and wherein the moment of inertia about the fulcrum at the junction to the vibrating base 11 due to the Z-directional vibration of the first vibrating bars 12, 13 is substantially equal to that due to the Z-directional vibration of the second vibrating bars 14, 15. The arrangement of the support rod 16 and fixed stage 17 is also basically the same as that in the first and second embodiments.

The difference from the first and second embodiments is the excitation directions; the excitation of vibration was always of the X-directions in the first and second embodiments, whereas the two second vibrating bars are excited to vibrate in opposite phases to each other in the Z-directions in the present embodiment. If this Z-directional excitation of the left and right bars in the opposite phases is simply carried out, i.e., if simple self-excited vibration is effected, coupled vibration will occur between the first vibrating bars and the second vibrating bars, but there will appear a phenomenon in which the phases of the first and second vibrating bars paired become identical to each other, different from the Z-directional vibration on the occasion of the X-directional excitation. Since the present invention is adapted so that the moments of inertia are matched with each other to prevent the Z-directional swing of the vibrator base when the first vibrating bars and the second vibrating bars vibrate in opposite phases to each other in the Z-directions, thereby preventing the leak of the vibration due to the Coriolis' force and thereby enhancing the detection accuracy, the present invention is not effective in cases where the first and second vibrating bars vibrate in the same phase. The present embodiment is thus arranged to excite the first vibrating bar and the second vibrating bar paired in opposite phases by employing the feedback method concerning the phases for the excitation means.

In this embodiment the second vibrating bars are excited to vibrate in the Z-directions and this vibration is transmitted to the first vibrating bars. When in this state the vibrator rotates about an axis parallel to the Y-axis, X-directional vibration occurs in the first vibrating bars because of the Coriolis' force and the amplitude thereof is detected. The angular velocity of rotation is computed from the result of the detection.

Figure 14A:
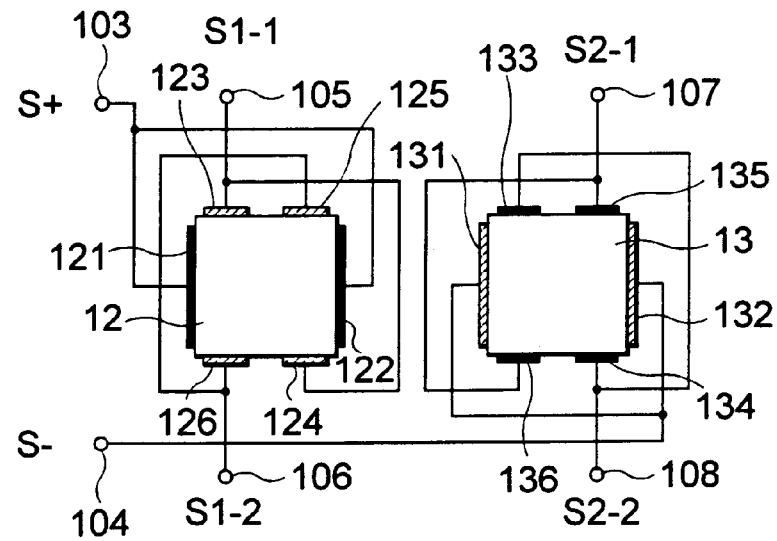
FIG. 14A is a sectional view to show the electrodes of the vibrating bars of the third embodiment.
Figure 14B:
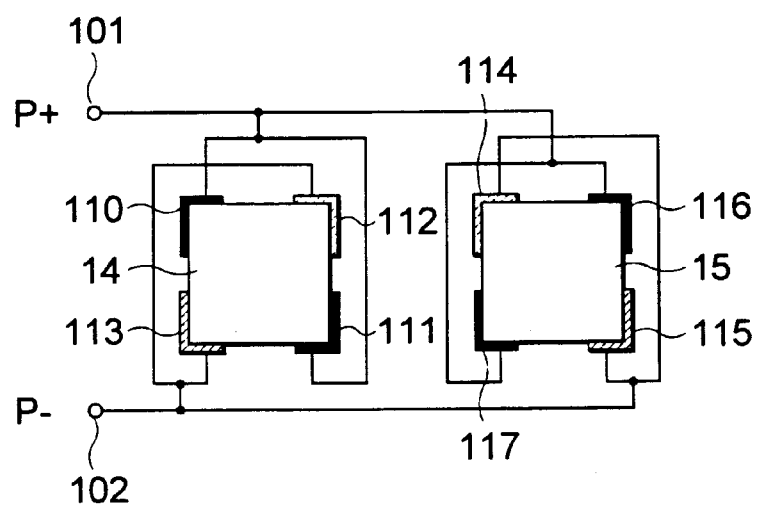
FIG. 14B is a sectional view to show the other electrodes of the vibrating bars of the third embodiment.

FIG. 14A and FIG. 14B are diagrams to show the electrodes provided on the first and second vibrating bars, respectively, and FIG. 15 is a diagram to show circuits for excitation and detection connected to these electrodes.

FIG. 14B shows the electrodes for exciting the second vibrating bars 14, 15 in the Z-directions, which are arranged in the same electrode arrangement as the detection electrodes of the first embodiment. In the same figure, a positive potential is applied to P+ terminal 101 and a negative potential to P− terminal 102, whereupon an electric field directed from the electrode 110 to 112 appears in the upper half of the second vibrating bar 14 while an electric field directed from the electrode 111 to 113 appears in the lower half. Then, the upper half expands in the Y-directions while the lower half contracts in the Y-directions because of the piezoelectric effect of quartz. Therefore, the second vibrating bar 14 is bent in the negative Z direction (downward). On the other hand, the voltage of the opposite polarity to that of the second vibrating bar 14 is applied to the second vibrating bar 15, so that the second vibrating bar 15 is bent in the positive Z direction. Accordingly, the second vibrating bars 14 and 15 vibrate in opposite phases to each other in the Z-directions by alternately switching the polarities of the terminals 101 and 102.

FIG. 14A shows the electrodes for detecting the Z-directional and X-directional vibrations of the first vibrating bars 12 and 13, each vibrating bar being provided with six electrodes extending in the Y-direction. Specifically, as illustrated, each side face is provided with one electrode 121, 122, 131, or 132 and each of the top surface and bottom surface is provided with two electrodes 123, 125, 124, 126, 133, 135, 134, 136.

The Z-directional bending (vibration) of the first vibrating bars is detected by the electrodes 123 to 126 and the electrodes 133 to 136. When the first vibrating bar 12 is bent in the positive Z direction, the upper half contracts in the Y-directions while the lower half expands in the Y-directions. Because of the piezoelectric effect of quartz, the Y-directional contraction causes X-directional dielectric polarization and the Y-directional expansion causes opposite X-directional dielectric polarization. The polarization is concentrated on the top surface and on the bottom surface. This causes the charge of the same polarity to gather in the electrodes 123 and 124 and the charge of the opposite polarity thereto to gather in the electrodes 125 and 126. From this change of charge amount, the Z-directional vibration is detected by the signal processing circuit shown in FIG. 15. Likewise, Z-directional vibration of the first vibrating bar 13 is detected from change of charge amount in the electrodes 133 to 136.

The X-directional bending (vibration) of the first vibrating bars 12 and 13 is detected by all the electrodes 121 to 126 and the electrodes 131 to 136. With the X-directional bending, because of the piezoelectric effect according to the inverse mechanism to the inverse piezoelectric effect described with FIGS. 3A and 3B, the charge of the same polarity gathers in the top and bottom surfaces while the charge of the opposite polarity thereto gathers in the electrodes on the left and right side faces. The X-directional vibration is detected by the circuitry of FIG. 15 from this change of charge.

Next described is the excitation and detection circuitry of FIG. 15. The excitation circuit 201 applies excitation signals of the frequency almost equal to the Z-directional coupling natural frequency of the vibrator 10 in opposite phases to each other to terminals 101 and 102. This vibrates the second vibrating bars 14, 15 in opposite phases in the Z-directions and the vibration is transmitted to the first vibrating bars 12, 13 each paired therewith. The Z-directional vibrations of the first vibrating bars are combined (into waveform 222) by obtaining the difference between the change of charge (waveform 220) appearing in the same phase at the terminals 105 and 107 and the change of charge (waveform 221) appearing in the same phase at the terminals 106 and 108, and the combined signal is supplied to pulse shaping circuit 202.

The pulse shaping circuit 202 converts this signal to a signal of rectangular pulses 223 and the pulse signal is supplied as vibration phase information of the first vibrating bars 12 and 13 to the excitation circuit 201. The excitation circuit 201 outputs the driving signals in the phases opposite to the rectangular pulse signal 223 fed back from the pulse shaping circuit 202. This causes the first vibrating bars and the second vibrating bars paired with each other to undergo coupled vibration in the opposite phases to each other.

When the vibrator 10 rotates about an axis parallel to the Y-axis with the first vibrating bars vibrating in the Z-directions, the first vibrating bars vibrate in the X-directions in the amplitude according to the angular velocity Ω of the rotation, and this X-directional vibration is detected. For that, the signals at the terminals 105 and 106 are added up and thereafter a difference is taken from a signal at the terminal 103 to obtain waveform 230 representing the X-directional vibration of the second vibrating bar 12. In fact, most of the X-directional vibration is the leak component of the excitation vibration, on which X-vibration due to the Coriolis' force with the phase shift of 90° according to the angular velocity Ω is superimposed. Likewise, the signals at the terminals 107 and 108 are added up and thereafter a difference from a signal at the terminal 104 is taken to obtain waveform 231 representing the X-directional vibration of the second vibrating bar 13. This waveform has the phase shift of 180° from the waveform 230 and a difference between the two waveforms is calculated to obtain waveform 232 representing the combination of the two X-directional vibrations of the second vibrating bars 12 and 13, which is supplied to synchronous detection circuit 204.

The synchronous detection circuit 204 receives a pulse signal 224 having the phase shifted 90° from the phase of the Z-directional vibration, from phase converting circuit 203 and performs synchronous detection of the input signal 232 using the pulse signal to obtain waveform 233. The input signal 232 is the combined signal of the leak component of excitation and the component based on the Coriolis' force as previously stated, and the output signal 233 from the synchronous detection circuit 204 results from full-wave rectification of the component based on the Coriolis' force. Since the leak component of the excitation, which is the major component of the detection signal 232, has the phase shift of 90° from the pulse signal 224 for detection, the output signal has the sawtooth waveform as indicated by the waveform 233. When this waveform 233 is integrated in integration circuit 205, the leak component of excitation becomes zero and only the X-component due to the Coriolis' force remains. This signal is supplied to offset removing circuit 206 to remove the offset component and the signal is amplified by amplifier 207 to be outputted from terminal 208.

The signal representing the amplitude of the X-directional vibration due to the Coriolis' force, obtained at the terminal 208 as described above, is supplied to the angular velocity calculating circuit not illustrated and the angular velocity $\Omega$ of the rotation about the axis parallel to the Y-axis is computed based on the relation of $F=2\ mV\cdot\Omega$.

Next described is a method for designing the dimensions of the vibrator 10 used in the angular velocity detecting apparatus of the present embodiment.

First, the X-directional natural frequency fn of the second vibrating bars 14, 15 is determined. This is determined by applying Eq. (12) used in the description of the first embodiment. In this example, the length L2 of the second vibrating bars is 6 mm and the thickness h of the quartz substrate is 0.4 mm. Since it is empirically known as to the Z-directional vibration of the vibrating bar that, in the case of a single vibrator being assumed, a computation result agrees well with actual natural frequency where computation is made under the assumption that the vibrator has the thickness equal to ⅚ of the actual thickness, h is set to be 0.33 mm. These values of L2 and h are substituted into Eq. (12), together with $E=7.99\times10^9$ kg/m², $r=2.65\times10^3$ kg/m³, $\lambda n=1.85$, and $g=9.8$, which are determined from the material constants etc. of quartz. Then we obtain fn=7839 Hz. This means that the second vibrating bars have the natural frequency of about 7.8 kHz.

The Z-directional coupling natural frequency of the first and second vibrating bars becomes close to the natural frequency of the second vibrating bars, which have larger stress because the second vibrating bars are narrower and longer than the first vibrating bars. Then, the X-directional natural frequency of the first vibrating bars is set closer to the Z-directional coupling natural frequency, i.e., to the Z-directional natural frequency of the second vibrating bars. For that purpose, the following condition is to be satisfied.

$$W1/L1^2 = h/L2^2$$

Here, W1 and L1 represent the width and length of the first vibrating bars, respectively. Substituting h=0.33 and L2=6 into it, we obtain the following.

$$W1 = 0.00926\ L1^2$$

Here, L1 is set to an arbitrary length under the condition that it is smaller than L2. Supposing L1=5.8, W1 becomes 0.312.

Next, the width W2 of the second vibrating bars is obtained by applying the graph of FIG. 10 to indicate the condition for matching the moments of inertia of the first vibrating bars and second vibrating bars with each other, in the relation between the length ratio L1/L2 and the width ratio W1/W2 of the first and second vibrating bars. Since L1/L2=5.8/6=0.967, W1/W2=1.75 is obtained by applying it to the graph of the condition for matching the moments of inertia illustrated in FIG. 10. Therefore, W2=0.312/1.75=0.178.

The above determined the length, width, and thickness of the first and second vibrating bars. As a result, we obtain W1=0.312, W2=0.178, L1=5.8, L2=6, and h=0.33.

For computing these numerals more precisely, it is normal practice to compute them by the FEM analysis using a computer. This method permits us to precisely compute the numerals for vibrators of complex shapes including the vibrator base. The computation was made under the conditions of L1=5.8, L2=6, and h=0.3. We obtained W1=0.316 and W2=0.207. FIG. 13 includes the dimensions obtained by the FEM analysis, in units of mm.

The present embodiment is arranged to excite the vibrating bars in the Z-directions and detect the X-directional vibration generated by the Coriolis' force. For that, the second vibrating bars are excited in the Z-directions and the X-directional vibration of the first vibrating bars is detected. It is, however, noted that the vibrating bars for excitation and for detection are not limited to the second vibrating bars and the first vibrating bars, respectively. Specifically, the vibrator may be one in which the second vibrating bars are excited in the Z-directions and the same second vibrating bars are used to detect the X-directional vibration thereof; or the vibrator may be one in which the first vibrating bars are excited in the Z-directions and the second vibrating bars are used to detect the X-directional vibration thereof.

Figure 16A:
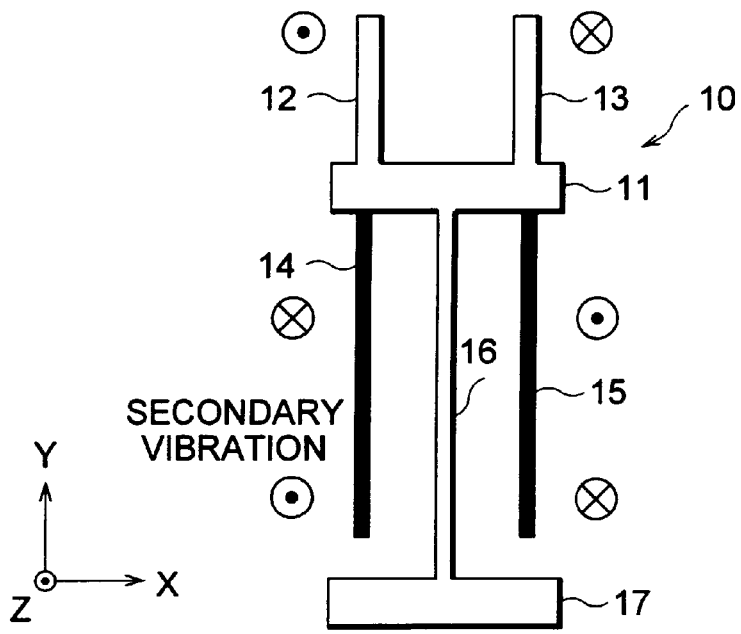
FIG. 16A is a diagram to show the vibrator of a fourth embodiment.

The fourth embodiment of the present invention will be described below referring to FIGS. 16A and 16B. FIG. 16A is a plan view of the vibrator 10 and the basic structure of the vibrator 10 is similar to that of the first to third embodiments. Specifically, the vibrator has two, wide and short, first vibrating bars 12, 13 projecting in the positive Y direction from the vibrator base 11 and two, narrow and long, second vibrating bars 14, 15 projecting in the negative Y direction, and the moment of inertia about the fulcrum at the junction to the vibrator base 11 due to the Z-directional vibration of the first vibrating bars 12, 13 is substantially equal to the moment of inertia in a higher vibration mode, described below, about the fulcrum at the junction to the vibrator base 11 due to the Z-directional vibration of the second vibrating bars 14, 15. The arrangement of support rod 16 and fixed stage 17 is also basically the same as in the first to third embodiments.

The difference from the first to third embodiments is that the second vibrating bars narrower and longer than the first vibrating bars are vibrated in the secondary vibration mode. In this embodiment the first vibrating bars 12, 13 are excited in opposite phases to each other in the X-directions. Then, Z-directional vibration occurs in the first vibrating bars because of the Coriolis' force appearing with rotation of the vibrator. This Z-directional vibration of the first vibrating bars due to the Coriolis' force is transmitted to the second vibrating bars, because the first vibrating bars and the second vibrating bars paired with each other are coupled as to the Z-directional vibration. The Z-directional leak vibration of the first vibrating bars is also transmitted to the second vibrating bars. The frequency of the excitation and the dimensions of the vibrating bars are determined so that the Z-directional vibration of the second vibrating bars is of the secondary vibration mode. Therefore, as a matter of course, the second vibrating bars vibrate in the Z-directions in the secondary vibration mode. The Z-directional vibrations of the second vibrating bars 14 and 15 are of the opposite phases to each other, because the X-directional excitations of the first vibrating bars 12 and 13 are of the opposite phases to each other.

Figure 16B:
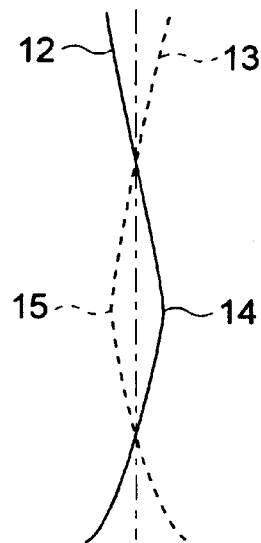
FIG. 16B is an operational diagram to show a state of vibration of the vibrator.

FIG. 16B is a side view of the vibrator 10 of FIG. 16A observed from the X-direction, which shows a state of the Z-directional vibration of the vibrating bars. In the same figure the first vibrating bar 12 and second vibrating bar 14 paired on the left side are represented by the solid line and the first vibrating bar 13 and second vibrating bar 15 paired on the right side by dashed line. The figure shows a state in which the first vibrating bar 12 is deflected in the positive Z direction and the first vibrating bar 13 in the negative Z direction. At this time, since the second vibrating bars 14 and 15 vibrate in the secondary vibration mode, the second vibrating bar 14 is deflected in the positive Z direction at the tip but in the negative Z direction near the center. The second vibrating bar 15 is deflected inversely in the negative Z direction at the tip but in the positive Z direction near the center.

The electrodes for X-directional excitation provided on the first vibrating bars 12, 13 of the vibrator 10 can be placed in the similar arrangement to the electrodes for excitation in the first embodiment. The electrodes for detection of the Z-directional vibration on the second vibrating bars 14, 15 are the electrodes which are similar to those in the first embodiment and which are shifted in the Y-direction. It is desirable to place the detection electrodes at positions where internal stress due to vibration appears strong. Therefore, they were placed on the base side in the first embodiment, but they are shifted to near the center to be located at the antinode portion of the secondary vibration in the present embodiment.

Next described is a method of dimension design of the vibrator 10 of the present embodiment. First, the Z-directional secondary natural frequency fn2 of the second vibrating bars is determined. The natural frequency fn2 is determined based on the following equation obtained by replacing the primary vibration constant $\lambda n$ of Eq. (12) used in the first embodiment with the secondary vibration constant $\lambda n2$.

$$fn2 = \frac{\lambda n2^2 \cdot h}{2\pi \cdot L2^2} \sqrt{\frac{E \cdot g}{12 \cdot r}} \qquad (16)$$

In this equation, E represents the coefficient of longitudinal elasticity of quartz, r the density of quartz, $\lambda n2$ the constant of secondary vibration, g the acceleration of gravity, L2 the length of the second vibrating bars, and h the thickness of the vibrating bars (the thickness of the vibrator).

From the material constants etc. of quartz, the following is given.

E=7.99×10$^9$ kg/m$^2$
r=2.65×10$^3$ kg/m$^3$
$\lambda$n=4.694
g=9.8

The Z-directional secondary natural frequency fn2 of the second vibrating bars can be determined by substituting these numerals and appropriately selected numerals of h and L2 into above Eq. (16).

Next, let us consider the condition for equalizing this Z-directional secondary natural frequency fn2 to the X-directional natural frequency fn of the first vibrating bars. The X-directional natural frequency fn of the first vibrating bars is given by the following equation.

$$fn = \frac{\lambda n^2 \cdot W1}{2\pi \cdot L1^2} \sqrt{\frac{E \cdot g}{12 \cdot r}} \qquad (17)$$

Here, W1 and L1 are the X-directional width and length of the first vibrating bars.

From computation of fn2=fn, we obtain the following.

$$W1/L1^2 = (\lambda n2^2 / \lambda n^2) \cdot h / L2^2$$
$$= 6.267 h / L2^2$$

Since the appropriate values are already selected for h and L2, the value of $W1/L1^2$ is a constant.

Finally, W1 and L1 can be determined by applying the condition for matching the moment of inertia of the first vibrating bars with that of the second vibrating bars.

In the fourth embodiment, the ratio of lengths of the first vibrating bars and the second vibrating bars is greater than in the case of the primary vibration mode (the first embodiment), so as to make larger the difference between the X-directional natural frequencies of the first vibrating bars and the second vibrating bars; therefore, the transmission of vibration is interrupted more between the two vibrating bars. Therefore, the second vibrating bars are vibrated purely only in the Z-directions, so that the detection accuracy is high.

Since the internal stress concentrating portion of the secondary vibration is the central part of the vibrating bars, the detection electrodes are positioned in the central part of the vibrating bars. Formation of the electrodes in the central part is easier than formation of the electrodes in the base part. The reason is as follows; the vibrator is produced by etching of substrate, and the shape of the base part of the vibrating bars is instable while the central part is stable because of the relation of crystallographic directions. The fourth embodiment utilized the secondary vibration mode of the second vibrating bars, whereas a higher vibration mode such as the third or higher mode may also be used. The fourth embodiment is arranged to excite the first vibrating bars in the X-directions in the primary vibration mode and to detect the vibration in the secondary vibration mode of the second vibrating bars in the Z-directions, but the vibrator may also be arranged to excite the second vibrating bars in the X-directions in the primary vibration mode and to vibrate the second vibrating bars in the Z-directions in the secondary vibration mode. In that case, it can be contemplated that the second vibrating bars are constructed in such two-step widths that the base side is wider than the tip side, and that the excitation electrodes are placed in narrower portions on the tip side while the detection electrodes in wider portions on the base side or on the first vibrating bars. In this structure of the vibrator, as to the X-directional vibration (excitation), the Y-directional length of the narrower portion becomes the substantial length of the second vibrating bars and, as to the Z-directional vibration, the entire length of the second vibrating bars becomes the substantial length, whereby the same vibrating bars can be vibrated in the primary vibration mode as to the X-directional vibration and in the secondary vibration mode as to the Z-directional vibration.

This modification of the fourth embodiment permits us to freely select the ratio of thickness and lateral width to some extent by changing the ratio of widths. This permits us to employ a thin quartz substrate easy to etch accordingly.

The first to the fourth embodiments described above were the vibrators all having the two first vibrating bars and the two second vibrating bars, i.e., the two pairs of first vibrating bars and second vibrating bars projecting substantially on the same axes with the vibrator base in between. It is, however, noted that the present invention is not limited to this structure, but the function as a vibrator can be exhibited as long as it has at least one set of vibrating bars comprised of the first vibrating bar and second vibrating bar. The specific effect of the present invention in which the vibrator base does not vibrate in the Z-directions can be demonstrated as long as the Z-directional moment of inertia of the first vibrating bar is matched with that of the second vibrating bar.

The single-crystal substrate of quartz was used for the vibrators, but the vibrators may also be made of another piezoelectric material, for example, selected from titanate zirconate alloys (PZT), lithium niobate, lithium tantalate, and so on. Further, the vibrator may be a simple vibrator of stainless steel, for example, and the vibrator may be vibrated using the excitation means of piezoelectric members instead of the electrodes.

As described above, the angular velocity detecting apparatus of the present invention is arranged so that the moment of inertia of the first vibrating bar is substantially equal to that of the second vibrating bar; therefore, when the two vibrating bars vibrate in opposite phases to each other in the Z-directions, the vibrator base constituting the fulcrum of the Z-directional vibration between the two vibrating bars is prevented from swinging in the Z-directions. Therefore, there appears little vibration leak from the vibrator base and the amplitude of the vibration caused by the Coriolis' force is not attenuated. The vibration can be detected with high sensitivity accordingly. Namely, the detection accuracy of angular velocity $\Omega$ becomes higher.

What is claimed is:

1. An angular velocity detecting apparatus comprising, in a three-dimensional coordinate space of X, Y, and Z, a vibrator having a vibrator base extending in an X-direction on an XY plane, a first vibrating bar projecting in a positive Y direction from the vibrator base and having a first natural frequency in X-directions, and a second vibrating bar projecting in a negative Y direction, from said vibrator base and having a second natural frequency in the X-directions, different from said first natural frequency; excitation means for exciting either said first or second vibrating bar in the Z-directions or in the X-directions; detection means for detecting an amplitude of vibration orthogonal to directions of excitation of vibration caused in said first or second vibrating bar by said excitation means; and angular velocity calculating means for calculating an angular velocity of rotation about an axis in the Y-direction from the magnitude of the amplitude detected by said detection means, wherein geometric dimensions of said first and second vibrating bars are determined so as to prevent said vibrator base from vibrating in the Z-directions when said first or second vibrating bar is excited by said excitation means.

2. The angular velocity detecting apparatus according to claim 1, wherein said geometric dimensions of the first and second vibrating bars are determined so that a moment of inertia about a fulcrum at a junction to said vibrator base due to Z-directional vibration of said first vibrating bar during excitation of said first or second vibrating bar by said excitation means is substantially equal to that due to Z-directional vibration of said second vibrating bar.

3. The angular velocity detecting apparatus according to claim 2, wherein there are two pairs of said first vibrating bar and said second vibrating bar provided with respect to said vibrator base, said vibrator base is fixed through a support rod to said detected body, the support rod extends in the Y-direction from said vibrator base between one vibrating bar pair and the other vibrating bar pair out of said two pairs of vibrating bars, and the tip of the support rod is fixed to said detected body.

4. The angular velocity detecting apparatus according to claim 1, wherein said second vibrating bar is narrower and longer than said first vibrating bar.

5. The angular velocity detecting apparatus according to claim 2, wherein said second vibrating bar is narrower and longer than said first vibrating bar.

6. The angular velocity detecting apparatus according to claim 3, wherein said second vibrating bar is narrower and longer than said first vibrating bar.

7. The angular velocity detecting apparatus according to claim 1, wherein said excitation means excites said first vibrating bar in the X-directions.

8. The angular velocity detecting apparatus according to claim 2, wherein said excitation means excites said first vibrating bar in the X-directions.

9. The angular velocity detecting apparatus according to claim 3, wherein said excitation means excites said first vibrating bar in the X-directions.

10. The angular velocity detecting apparatus according to claim 3, wherein said excitation means excites said two first vibrating bars in opposite phases to each other in the X-directions.

11. The angular velocity detecting apparatus according to claim 3, wherein an X-directional width W of the first vibrating bar is not more than 0.7 times a Z-directional thickness D.

12. The angular velocity detecting apparatus according to claim 1, wherein said excitation means excites either said first vibrating bar or second vibrating bar in the Z-directions and phases of said excitation are adjusted so that Z-directional vibration of said first vibrating bar and Z-directional vibration of said second vibrating bar are of opposite phases to each other.

13. The angular velocity detecting apparatus according to claim 2, wherein said excitation means excites either said first vibrating bar or second vibrating bar in the Z-directions and phases of said excitation are adjusted so that Z-directional vibration of said first vibrating bar and Z-directional vibration of said second vibrating bar are of opposite phases to each other.

14. The angular velocity detecting apparatus according to claim 3, wherein said excitation means excites either said first vibrating bar or second vibrating bar in the Z-directions and phases of said excitation are adjusted so that Z-directional vibration of said first vibrating bar and Z-directional vibration of said second vibrating bar are of opposite phases to each other.

15. The angular velocity detecting apparatus according to claim 1, wherein said first vibrating bar and second vibrating bar constituting said pair have respective longitudinal center axes shifted from each other, and wherein a moment of inertia of said first vibrating bar about a fulcrum at a fixed portion of said vibrator base to said detected body during the excitation of said first or second vibrating bar by said excitation means is substantially equal to that of said second vibrating bar.

16. The angular velocity detecting apparatus according to claim 2, wherein said first vibrating bar and second vibrating bar constituting said pair have respective longitudinal center axes shifted from each other, and wherein a moment of inertia of said first vibrating bar about a fulcrum at a fixed portion of said vibrator base to said detected body during the excitation of said first or second vibrating bar by said excitation means is substantially equal to that of said second vibrating bar.

17. The angular velocity detecting apparatus according to claim 3, wherein said first vibrating bar and second vibrating bar constituting said pair have respective longitudinal center axes shifted from each other, and wherein a moment of inertia of said first vibrating bar about a fulcrum at a fixed portion of said vibrator base to said detected body during the excitation of said first or second vibrating bar by said excitation means is substantially equal to that of said second vibrating bar.

18. The angular velocity detecting apparatus according to claim 1, wherein a frequency of the excitation by the excitation means is substantially matched with a natural frequency of a Z-directional higher vibration mode of either said first vibrating bar or second vibrating bar.

19. The angular velocity detecting apparatus according to claim 2, wherein a frequency of the excitation by the excitation means is substantially matched with a natural frequency of a Z-directional higher vibration mode of either said first vibrating bar or second vibrating bar.

20. The angular velocity detecting apparatus according to claim 3, wherein a frequency of the excitation by the excitation means is substantially matched with a natural frequency of a Z-directional higher vibration mode of either said first vibrating bar or second vibrating bar.

21. The angular velocity detecting apparatus according to claim 1, wherein said vibrator base and said first and second vibrating bars constituting said vibrator are made of a single substrate having a uniform thickness.

22. The angular velocity detecting apparatus according to claim 2, wherein said vibrator base and said first and second vibrating bars constituting said vibrator are made of a single substrate having a uniform thickness.

23. The angular velocity detecting apparatus according to claim 3, wherein said vibrator base and said first and second vibrating bars constituting said vibrator are made of a single substrate having a uniform thickness.

24. The angular velocity detecting apparatus according to claim 4, wherein said vibrator base and said first and second vibrating bars constituting said vibrator are made of a single substrate having a uniform thickness.

25. The angular velocity detecting apparatus according to claim 5, wherein said vibrator base and said first and second vibrating bars constituting said vibrator are made of a single substrate having a uniform thickness.

26. The angular velocity detecting apparatus according to claim 6, wherein said vibrator base and said first and second vibrating bars constituting said vibrator are made of a single substrate having a uniform thickness.

27. The angular velocity detecting apparatus according to claim 7, wherein said vibrator base and said first and second vibrating bars constituting said vibrator are made of a single substrate having a uniform thickness.

28. The angular velocity detecting apparatus according to claim 8, wherein said vibrator base and said first and second vibrating bars constituting said vibrator are made of a single substrate having a uniform thickness.

29. The angular velocity detecting apparatus according to claim 9, wherein said vibrator base and said first and second vibrating bars constituting said vibrator are made of a single substrate having a uniform thickness.

30. The angular velocity detecting apparatus according to claim 10, wherein said vibrator base and said first and second vibrating bars constituting said vibrator are made of a single substrate having a uniform thickness.

31. The angular velocity detecting apparatus according to claim 11, wherein said vibrator base and said first and second vibrating bars constituting said vibrator are made of a single substrate having a uniform thickness.

32. The angular velocity detecting apparatus according to claim 12, wherein said vibrator base and said first and second vibrating bars constituting said vibrator are made of a single substrate having a uniform thickness.

33. The angular velocity detecting apparatus according to claim 13, wherein said vibrator base and said first and second vibrating bars constituting said vibrator are made of a single substrate having a uniform thickness.

34. The angular velocity detecting apparatus according to claim 14, wherein said vibrator base and said first and second vibrating bars constituting said vibrator are made of a single substrate having a uniform thickness.

35. The angular velocity detecting apparatus according to claim 15, wherein said vibrator base and said first and second vibrating bars constituting said vibrator are made of a single substrate having a uniform thickness.

36. The angular velocity detecting apparatus according to claim 16, wherein said vibrator base and said first and second vibrating bars constituting said vibrator are made of a single substrate having a uniform thickness.

37. The angular velocity detecting apparatus according to claim 17, wherein said vibrator base and said first and second vibrating bars constituting said vibrator are made of a single substrate having a uniform thickness.

38. The angular velocity detecting apparatus according to claim 18, wherein said vibrator base and said first and second vibrating bars constituting said vibrator are made of a single substrate having a uniform thickness.

39. The angular velocity detecting apparatus according to claim 19, wherein said vibrator base and said first and second vibrating bars constituting said vibrator are made of a single substrate having a uniform thickness.

40. The angular velocity detecting apparatus according to claim 20, wherein said vibrator base and said first and second vibrating bars constituting said vibrator are made of a single substrate having a uniform thickness.

* * * * *